United States Patent
Mizutani et al.

(10) Patent No.: US 8,134,721 B2
(45) Date of Patent: Mar. 13, 2012

(54) DIRECT-PRINTING SYSTEMS AND METHODS

(75) Inventors: Norio Mizutani, Mie-ken (JP); Kousuke Fukaya, Chiryu (JP); Naoki Hashimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1019 days.

(21) Appl. No.: 12/007,927

(22) Filed: Jan. 17, 2008

(65) Prior Publication Data

US 2008/0170261 A1   Jul. 17, 2008

(30) Foreign Application Priority Data

Jan. 17, 2007   (JP) ................................ 2007-007697

(51) Int. Cl.
*G06F 15/00* (2006.01)
*G06F 3/12* (2006.01)
*G06K 1/00* (2006.01)

(52) U.S. Cl. ...................................... 358/1.13; 358/1.14
(58) Field of Classification Search .................. None
See application file for complete search history.

(56) References Cited

U.S. PATENT DOCUMENTS

| | | | | |
|---|---|---|---|---|
| 7,619,765 B2 * | 11/2009 | Kimura et al. | ............... | 358/1.15 |
| 2002/0062453 A1 | 5/2002 | Koga | | |
| 2003/0103229 A1 | 6/2003 | Weaver | | |
| 2004/0165211 A1 | 8/2004 | Herrmann et al. | | |
| 2005/0019077 A1 | 1/2005 | Hatta et al. | | |
| 2005/0083548 A1 | 4/2005 | Suga et al. | | |
| 2006/0062588 A1 | 3/2006 | Saka et al. | | |
| 2006/0282684 A1 | 12/2006 | Kakoi et al. | | |
| 2008/0005781 A1 * | 1/2008 | Koga | ............................... | 726/2 |

FOREIGN PATENT DOCUMENTS

| | | |
|---|---|---|
| JP | 11-216915 | 8/1999 |
| JP | H11-321029 A | 11/1999 |
| JP | 2002-236577 A | 8/2002 |
| JP | 2003-044255 A | 2/2003 |
| JP | 2003-228262 A | 8/2003 |
| JP | 2006-085630 A | 3/2006 |
| JP | 2006-341491 A | 12/2006 |

OTHER PUBLICATIONS

European Patent Office, European Search Report for European Patent Application No. 08250203.0, dated Nov. 9, 2010.
Japan Patent Office, Notification of Reason for Refusal for Japanese Patent Application No. 2007-007697, dispatched Jul. 26, 2011.

* cited by examiner

*Primary Examiner* — Douglas Tran
(74) *Attorney, Agent, or Firm* — Baker Botts L.L.P.

(57) ABSTRACT

A printer having a direct-printing function for reading and printing data stored in a storing unit, the printer including a connecting device, a user storage that stores user information including information of users permitted to print using the direct-printing function, a reading unit that reads identification information from data stored in the storing unit, a determining unit that determines whether the identification information corresponds to the user information, a direct-printing controlling unit that permits printing of the data using the direct-printing function if the determining unit determines that the identification information corresponds to the user information and prohibits printing of the data using the direct-printing function if the determining unit determines that the identification information does not correspond to the user information, and a print-executing unit executing printing if the direct-printing controlling unit permits printing of the data using the direct-printing function.

17 Claims, 17 Drawing Sheets

FIG. 9

| FILE NAME | USER INFORMATION | SECURITY | READABLE WITHOUT UNLOCKING SECURITY | PRINTABLE WITHOUT UNLOCKING SECURITY |
|---|---|---|---|---|
| FILE 1 | NO | NO | − | − |
| FILE 2 | A | NO | − | − |
| FILE 3 | B | NO | − | − |
| FILE 4 | NO | YES | ○ | ○ |
| FILE 5 | NO | YES | ○ | × |
| FILE 6 | NO | YES | × | × |
| FILE 7 | A | YES | ○ | ○ |
| FILE 8 | A | YES | ○ | × |
| FILE 9 | A | YES | × | × |
| FILE 10 | B | YES | ○ | ○ |
| FILE 11 | B | YES | ○ | × |
| FILE 12 | B | YES | × | × |
| FILE 13 | NO (ENCRYPTED) | YES | ○ | ○ |
| FILE 14 | NO (ENCRYPTED) | YES | ○ | × |
| FILE 15 | NO (ENCRYPTED) | YES | × | × |
| FILE 16 | A (ENCRYPTED) | YES | ○ | ○ |
| FILE 17 | A (ENCRYPTED) | YES | ○ | × |
| FILE 18 | A (ENCRYPTED) | YES | × | × |
| FILE 19 | B (ENCRYPTED) | YES | ○ | ○ |
| FILE 20 | B (ENCRYPTED) | YES | ○ | × |
| FILE 21 | B (ENCRYPTED) | YES | × | × |

FIG. 10

| FILE 1 | FILE 2 | FILE 3 | | | |
|---|---|---|---|---|---|
| PREFACE | DEAR | TITLE | | | |
| PRINTABLE | PRINTABLE | PRINTABLE | | | |

| FILE 4 | FILE 5 | FILE 6 | FILE 7 | FILE 8 | FILE 9 |
|---|---|---|---|---|---|
| JAPANESE UNEXAMINED PATENT PUBLICATION HEI | [locked] | [locked] | SAMPLE | [locked] | [locked] |
| PRINTABLE | PRINTABLE AFTER UNLOCKED | PRINTABLE AFTER UNLOCKED | PRINTABLE | PRINTABLE AFTER UNLOCKED | PRINTABLE AFTER UNLOCKED |

| FILE 10 | FILE 11 | FILE 12 | FILE 13 | FILE 14 | FILE 15 |
|---|---|---|---|---|---|
| ESTIMATE | [locked] | [locked] | BULLETIN REPORT | [locked] | [locked] |
| PRINTABLE | PRINTABLE AFTER UNLOCKED | PRINTABLE AFTER UNLOCKED | PRINTABLE | PRINTABLE AFTER UNLOCKED | PRINTABLE AFTER UNLOCKED |

| FILE 16 | FILE 17 | FILE 18 | FILE 19 | FILE 20 | FILE 21 |
|---|---|---|---|---|---|
| TEST | [locked] | [locked] | GRAPH | [locked] | [locked] |
| PRINTABLE | PRINTABLE AFTER UNLOCKED | PRINTABLE AFTER UNLOCKED | PRINTABLE | PRINTABLE AFTER UNLOCKED | PRINTABLE AFTER UNLOCKED |

DIRECT-PRINTING SYSTEMS AND METHODS

CROSS-REFERENCE TO RELATED APPLICATIONS

This application claims priority from Japanese Patent Application No. 2007-007697 filed on Jan. 17, 2007, the entire subject matter of which is incorporated herein by reference.

TECHNICAL FIELD

Aspects of the present invention relate to a printer, a communication system and a printing method, and more specifically, a printer, a communication system and a printing method which are capable of restricting operators who are able to print, preventing leakage of important information, and controlling consumption of consumables such as ink, sheets and toner, and which are capable of executing direct printing with simple operations when printing information stored in a portable storing unit is direct-printed by a printer having a direct-printing function.

BACKGROUND

There has been proposed a printer having a direct-printing function. Such a printer is capable of executing direct printing of printing information stored in a storing unit without any assistance of a host device such as a personal computer, when the storing unit is connected to the recording unit. The storing unit has been made small in size so that it is easily portable. Therefore, some users carries a storing unit in which such information is stored in order to read data necessary for business and private photographs at any time. A number of users who carry the storing unit have been increased. A user who carries the storing unit can simply print information and read the same by connecting the storing unit to a printer having a direct-printing function.

Herein, assume that a case where anyone can use a printer having a direct-printing function without any restriction. In such a case, important information stored in the storing unit can be easily printed out. Thus, there is a risk that the important information may be leaked. Furthermore, if an unauthorized operator can easily make a print, consumables may be consumed in large quantities.

JP-A-11-216915 discloses a printing system for which a password is established in advance in a computer, the password and printing information are transmitted to a printer, and an operator is urged to input the password in the printer. In the printing system, no printing is executed if the password set in advance in the computer differs from the password input by the operator in the printer. Thus, if such a structure is adopted, in which the password and printing information are stored in a storing unit, it may be possible to prevent important information from leaking and to prevent consumables from being consumed to some extent.

However, in such structure, the password is input whenever direct printing is executed. Thus, the more the password is input, the greater the possibility for the password to be leaked to outsiders other than the operator. As a result, important information may be leaked, and more consumables may be consumed.

In addition, the direct-printing function is to print information by connecting a storing unit to a printer. Therefore, it is advantageous if printing is executed with a simple operation. However, if the password is input each time direct printing is executed, the work becomes cumbersome. Thus, the advantage of direct printing may be lost.

SUMMARY

Aspects of the present invention provide a printer, a communication system and a printing method, which are capable of restricting operators who are able to print, preventing leakage of important information, and controlling unnecessary consumption of consumables such as ink, sheets, and toner and which are capable of executing direct printing with simple operations in a case where printing information stored in a portable storing unit is direct-printed by a printer having a direct-printing function.

According to an aspect of the present invention, there is provided a printer having a direct-printing function for reading and printing data stored in a storing unit, the printer including: a connecting device that connects to the storing unit; a user storage that stores user information including information of users permitted to print using the direct-printing function; a reading unit that reads identification information from data stored in the storing unit; a determining unit that determines whether the identification information corresponds to the user information; a direct-printing controlling unit that is operable to: permit printing of the data using the direct-printing function if the determining unit determines that the identification information corresponds to the user information; and prohibit printing of the data using the direct-printing function if the determining unit determines that the identification information does not correspond to the user information; and a print-executing unit that executes printing if the direct-printing controlling unit permits printing of the data using the direct-printing function.

According to another aspect of the present invention, there is provided a communication system including: a printer having a direct-printing function for reading and printing data stored in a storing unit; and a peripheral unit that is capable of communicating with the printer, wherein: the peripheral unit includes: a user storage that stores user information of users permitted to print using the direct-printing function; and the printer includes: a connecting device that connects to the storing unit; a reading unit that reads identification information from the data stored in the storing unit; an inquiring unit that inquires from the peripheral unit whether the identification information corresponds to the user information; a direct-printing controlling unit that is operable to: permit printing of the data using the direct-printing function if the inquiring unit responds that the identification information corresponds to the user information; and prohibit printing of the data using the direct-printing function if the inquiring unit responds that the identification information does not correspond to the user information; and a print-executing unit that executes printing if the direct-printing controlling unit permits printing of the data using the direct-printing function.

According to still another aspect of the present invention, there is provided a printing method for executing direct printing by reading data stored in a storing unit, the printing method including: reading user information from a user storage, the user storage storing the user information for which direct printing is permitted; reading identification information from the data stored in the storing unit; determining whether the identification information corresponds to the user information; direct printing the data if it is determined that the identification information corresponds to the user information; and prohibiting direct printing of the data if it is determined that the identification information does not correspond to the user information.

In other words, according to the aspects of the present invention, the user information stored in the user storage corresponds to user information read from predetermined information of the storing unit in the printer having the direct-printing function, printing of the predetermined information is permitted, whereas the respective user information does not correspond to each other, printing of the predetermined information is prohibited.

Therefore, according to the aspects of the present invention, it is possible to set permission and prohibition of printing based on the user information stored in advance in the user storage and operators capable of printing can be restricted based on the user information. Accordingly, important information can be prevented from leaking and consumption of consumables such as ink, sheets and toner can be further suppressed.

Since permission and prohibition of printing can be set by the direct-printing controlling unit based on the user information stored in the user storage, an operator (a user) can execute printing without inputting any password, etc., when printing the predetermined information. Since the direct-printing function can execute printing by connecting the storing unit to the printer, it is preferable to execute printing with simple operations. Therefore, cumbersome work such as input of a password can be reduced when printing the predetermined information. Accordingly, aspects of the present invention may be suitable for a case where printing is executed by the direct-printing function.

BRIEF DESCRIPTION OF THE DRAWINGS

FIG. 9 is an exemplary schematic view showing one example of file information stored in a memory card;

FIG. 10 is an exemplary view showing one example of the index printing with the print restriction turned OFF;

FIG. 11 is an exemplary view showing one example of the index printing with the print restriction turned ON;

FIG. 16 is an exemplary view showing one example of panel display with the print restriction turned ON.

DETAILED DESCRIPTION

Figure 1:
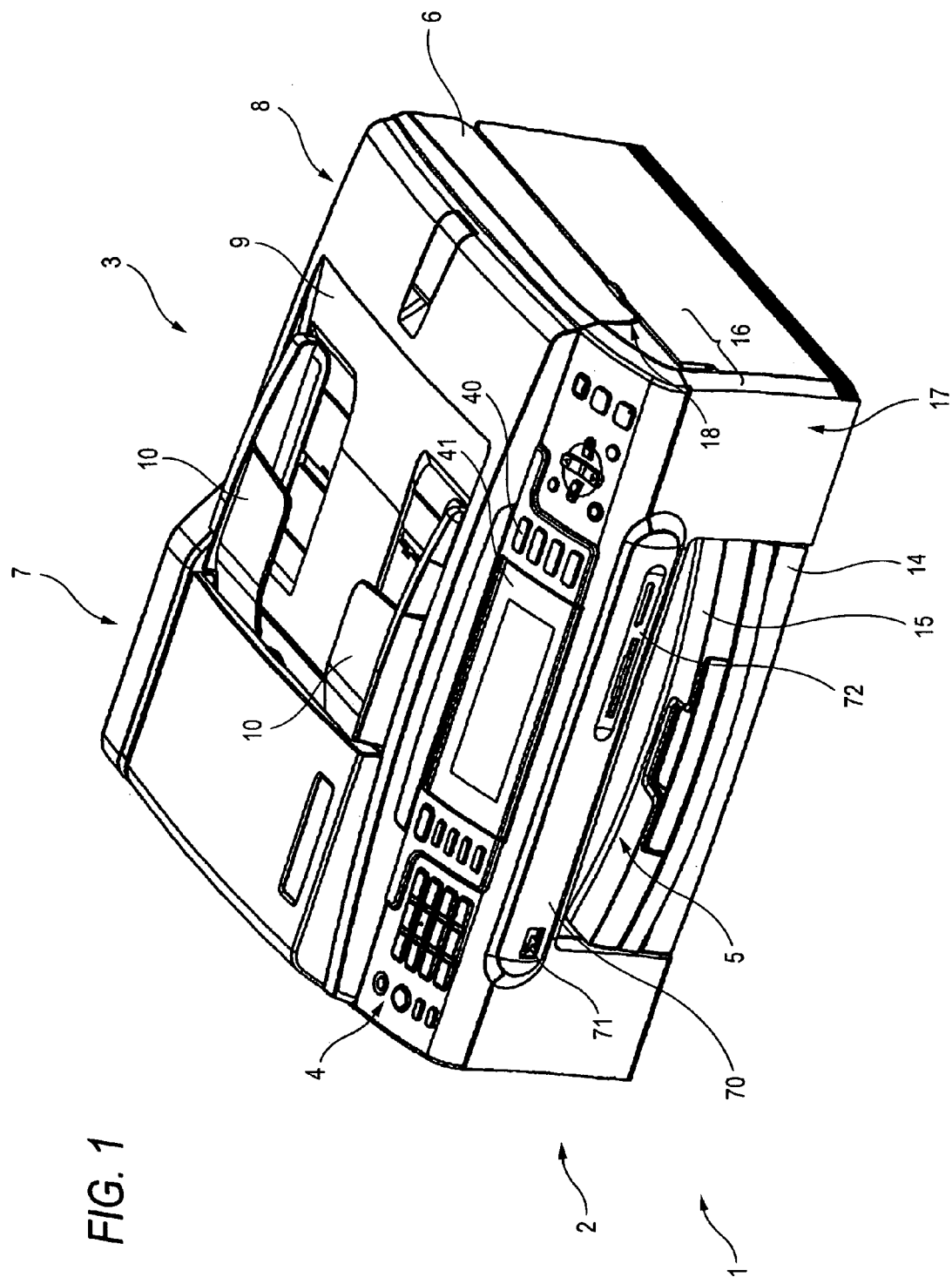
FIG. 1 is an exemplary perspective view of a multi-function device.

Illustrative aspects of the present invention will be described below with reference to the accompanying drawings. FIG. 1 is an exemplary perspective view showing the appearance structure of a multi-function device 1.

As shown in FIG. 1, the multi-function device (MFD) 1 includes a printer 2 provided at the lower part thereof, a scanner 3 provided at the upper part thereof, and an operation panel 4 secured at the front side of the scanner 3. The multi-function device 1 is capable of executing a scanner function, a copying function and a facsimile function.

In addition, the multi-function device 1 includes a medium function. For example, the medium function includes a function for receiving data from a peripheral unit such as a digital camera connected to the multi-function device 1 and forming the data on a recording sheet. Further, the medium function may include a function for receiving data stored in recording media with various types of recording media such as a memory card (example of storing unit) mounted and forming the data on recording sheets. Herein, the peripheral unit such as the digital camera may include a memory for storing data, and the medium function may include a function for receiving data stored in the memory and forming the data on recording sheets. Further, the multi-function device 1 is connected mainly to a computer (not illustrated) (including a computer existing on a network), and can form images and documents on recording sheets based on image data and document data transmitted from the corresponding computer. In addition, the multi-function device 1 may transmit data, which is received by the multi-function device 1 by execution of various types of functions, to a peripheral unit connected to the multi-function device 1 and may realize a function for allowing a peripheral unit having memory to store the data and a function for allowing the peripheral unit to execute various processes such as processing, display, transmission and printing of the data. Further, when applying the present invention to the multi-function device, the multi-function device 1 may not include all of the above-described functions. Still further, the multi-function device 1 can form data on not only recording sheets but also transparent film sheets for overhead projectors (OHP) and cloth.

In the scanner 3, a document cover 8 including an automatic document feeder (ADF) 7 is attached via hinges (not illustrated) at the rear side, to a document reading base 6 functioning as a flatbed scanner (FBS) so that the document cover 8 can be freely opened and closed. Although not illustrated, platen glass is disposed on the upper surface of the document reading base 6, and an image reading unit is internally incorporated in the interior of the document reading base 6.

The printer 2 is a so-called ink jet type image forming unit (ink jet recording device) that forms images on a recording sheet by selectively discharging ink drops based on image data read by the scanner 3 or image data input from the periphery. Incidentally, various types of image forming systems such as an electro-photographic system and a thermal transfer system may be adopted.

An opening 5 is formed at the front side of the multi-function device 1, in other words, at the front side of the printer 2. A sheet feeder tray 14 and a sheet delivery tray 15 are provided in the opening 5 so that these trays are completely included therein. A sheet conveyance path is provided in the printer 2, which is U-curved to the front side after extending upward from the deep side of the sheet feeder tray 14, and communicates with the sheet delivery tray 15.

The operation panel 4 is provided at the front side of the multi-function device 1. The operation panel 4 is provided to operate the printer 2 and the scanner 3 and to set various types of setting (setting for whether the printing restriction is turned on), and includes various types of operation keys 40 and a liquid crystal display (LCD) 41. A user is able to input predetermined instructions by using the operation panel 4. When a predetermined instruction is input in the multi-function device 1, movement of the corresponding multi-function device 1 is controlled by a control unit 20 (Refer to FIG. 2) based on the input information. In addition to the instructions input from the operation panel 4, the multi-function device 1 operates based on instructions transmitted from a computer via a printer driver and a scanner driver, etc., after being connected to the computer. The multi-function device 1 further operates based on instructions transmitted from a computer (example of peripheral unit) on the network via an Internet interface (Refer to FIG. 2).

A connection panel 70 is provided on the upper side of the opening 5 of the printer 2. A USB terminal 71 is disposed at the left end side of the connection panel 70. The USB terminal 71 is a connector terminal that connects the multi-function device 1 to a peripheral unit so as to allow them to communicate with each other by USB connection with the corresponding peripheral unit. A slot 72 is disposed at the right end side of the connection panel 70. The slot 72 includes a plurality of card slots in which memory cards (card type memories) can be mounted. If memory cards are mounted in the card slots or peripherals are connected to the USB terminal 71, and image data is read from the corresponding mounted memory cards into a control unit 20 described later, the read image data and information regarding the corresponding image data are displayed on the LCD 41 by the control unit 20 (the panel display process described later). Alternatively, an optional image selected may be formed on a recording sheet by the printer 2 (Index printing process described later). Incidentally, instead of the slot 72, the printer 2 may include a receiving portion that receives data in order to receive data through communications with the memory card or the peripheral. Here, the slot 72 functions as a connecting device.

Figure 2:
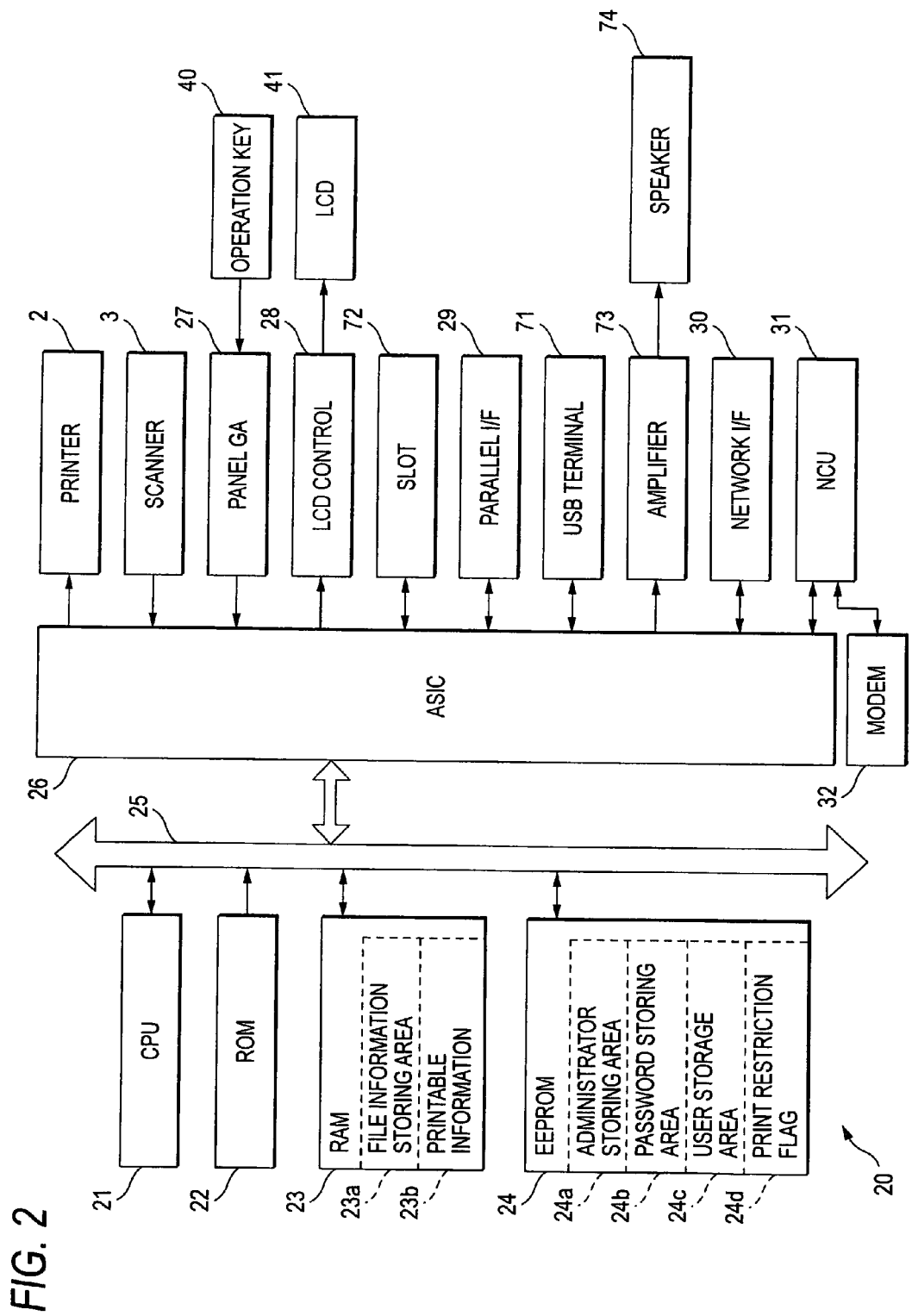
FIG. 2 is an exemplary block diagram of a control portion of the multi-function device.

FIG. 2 is an exemplary block diagram showing the brief structure of the control unit 20 of the multi-function device 1.

The control unit 20 totally controls the movements of the multi-function device 1 including the printer 2, the scanner 3 and the operation panel 4. As shown in the drawing, the control portion 20 is composed as a microcomputer and includes a central processing unit (CPU) 21, a read only memory (ROM) 22, a random access memory (RAM) 23, and an electrically erasable and programmable ROM (EEPROM) 24. The control portion is connected to an application specific integrated circuit (ASIC) 26 via a bus 25.

The CPU 21 totally controls the multi-function device 1. The CPU 21 executes various types of programs such as programs that execute the processes shown in the flowcharts of FIG. 3 through FIG. 8, FIG. 12 through FIG. 14, and FIG. 17. The ROM 22 stores programs for controlling respective types of movements of the multi-function device 1.

The RAM 23 is used as a memory area or work area in which various types of data used when the CPU 21 executes the above-described programs are temporary stored. The RAM 23 includes a file information storing area 23a and printable information 23b.

The file information storing area 23a temporary stores file information read from connected peripheral units or memory cards mounted in the slot 72. If a memory card is mounted in the slot 72, the file information stored in the memory card is read and stored.

The printable information 23b indicates whether the file information stored in the connected peripheral unit or the memory card can be printed. In the printable information 23b, information corresponding to respective files is set. The printable information 23b is set to [YES] if the file is printable (S505 in FIG. 7, S607 in FIG. 8, S803 in FIG. 13, and S905 in FIG. 14). If the file is printable after the security is unlocked (S508 in FIG. 7, S610 in FIG. 8, S807 in FIG. 13, and S909 in FIG. 14), the printable information 23b is set to [YES AFTER UNLOCKED]. If the file is not printable (S613 in FIG. 8 and S922 in FIG. 14), the printable information is set to [NO]. If it is not clear whether the file is printable (S623 in FIG. 8 and S933 in FIG. 14), the printable information 23b is set to [UNCLEAR].

The EEPROM 24 is a rewritable and non-volatile memory unit. The EEPROM 24 includes an administrator storing area 24a, a password storing area 24b, a user storage area 24c and a print restriction flag 24d.

The administrator storing area 24a stores information (operator information) indicating an administrator. The password storing area 24b stores information indicating the password, and the user storage area 24c stores information (user information) indicating a user. The information stored in the administrator storing area 24a, the password storing area 24b and the user storage area 24c is formed to be rewritable by an administrator who knows the name of the administrator and the password.

The print restriction flag 24d indicates whether users (operators) permitted to print are restricted. The print restriction flag 24d is turned on in the process of S308 in FIG. 5 and is turned off in the process of S309 in FIG. 5. In the present aspect, it is controlled that users permitted to print are restricted with the flag turned ON, and at the same time, the users permitted to print are not restricted with the flag turned OFF.

The ASIC 26 executes movement control of the printer 2, the scanner 3, the operation panel 4 and the slot 72 in compliance with instructions from the CPU 21. For example, the ASIC 26 controls the motor for driving the printer 2, the ink jet recording head, the motor for driving the ADF 7 of the scanner 3, and the movement of the image reading unit. Incidentally, the ASIC may control the USB terminal 71. A detailed description of the printer 2, the scanner 3 and the slot 72 is omitted.

A panel gate array 27 that controls the operation key 40 for inputting predetermined instructions to the multi-function device 1 is connected to the ASIC 26. An LCD controller 28 that controls image display of the LCD 41 is connected to the ASIC 26. The LCD controller 28 allows the LCD 41 to display the information regarding the movement of the printer 2 or the scanner 3 on the screen thereof based on instructions of the CPU 21. In detail, the CPU 21 allows a display memory (not illustrated) equipped in the RAM 23 to store image data corresponding to the images to be displayed on the LCD 41, wherein the LCD controller 28 reads the image data for display, and allows the same to be displayed in the LCD 41. The LCD controller may also display on the display the image corresponding to the data read by the scanner 3 or the image corresponding to the data received from the connected peripheral unit or a memory card inserted into the slot 72.

A parallel interface 29 and a USB terminal 71, which transmit data to and receive data from a computer via a parallel cable or a USB cable, are connected to the ASIC 26. In addition, a peripheral device such as a digital camera and a personal computer can be connected to the USB terminal 71 directly or via a USB cable. A network control unit (NCU) 31 and a modem 32, which achieve a facsimile function, are connected to the ASIC 26. An amplifier 73 is connected to the ASIC 26. The amplifier 73 outputs a calling tone, a rejection tone and a message by causing a speaker 74 connected to the amplifier 73 to sound.

A network interface (hereinafter called a network I/F) 30 is connected to the ASIC 26. The network I/F 30 is used for connecting to at least one computer existing on the network, and is able to transmit data to and receive the same from computers on the network.

Next, referring to FIG. 3 through FIG. 17, a description is given of registration of an administrator, registration of access-available users, an index printing process, a panel display process, and a file printing process.

Figure 3:
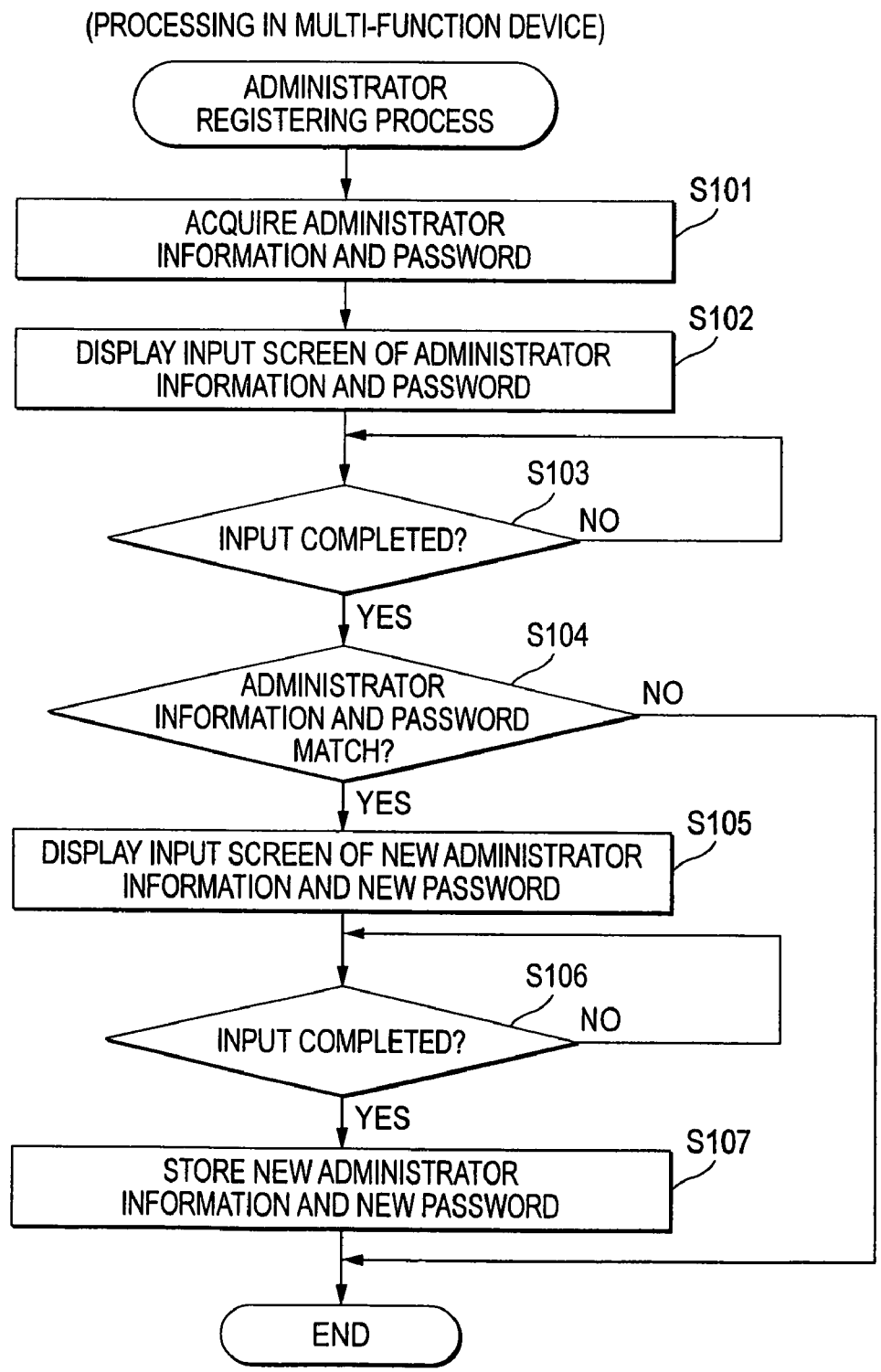
FIG. 3 is an exemplary flowchart showing an administrator registering process.

With reference to FIG. 3, a description is given of a process to register the administrator. FIG. 3 is an exemplary flowchart showing an administrator registration process executed by the CPU 21 of the multi-function device 1. The administrator registration process is executed when [Administrator registration] is selected among a plurality of functions by a user (operator) having operated the operation key 40.

When the administrator registration process is executed, the CPU 21 first acquires the information indicating an administrator stored in the administrator storing area 24a (hereinafter called administrator information) and the information indicating a password stored in the password storing area 24b (hereinafter called password) (S101). Then, the input screen of the administrator information and password has been displayed on the liquid crystal display 41 (S102), and the CPU 21 determines whether the administrator information and password are input by the user (S103). The CPU 21 stands by until the user inputs the administrator information and password (S103: NO).

If the administrator information and password are determined to be input by the user in S103 (S103: YES), it is determined whether the input administrator information and password match with (correspond to) the administrator information and password acquired in the process of S101 (S104). If both the administrator information and password are determined not to match with each other (S104: NO), it is determined that the user is not a user permitted to change (rewrite) the administrator information and password, and the process is terminated without changing the administrator information and password.

In contrast, if both the administrator information and password are determined to match with each other in S104 (S104: YES), it is determined that the user is a user permitted to change (rewrite) the administrator information and password. Then, an input screen of new administrator information and new password are displayed on the liquid crystal display 41 (S105), and it is determined whether the new administrator information and new password are input by the user (S106).

In the process of S106, the CPU 21 stands by until the new administrator information and new password are input by the user (S106: NO). If the new administrator information and new password are input by the user (S106: YES), the new administrator information is stored in the administrator storing area 24a. At the same time, the new password is stored in the password storing area 24b (S107). Then, the process is terminated.

As described above, in the multi-function device 1, only the user who knows the administrator information and password can modify the administrator information and the password. Accordingly, it is possible to prevent the administrator information and the password from being easily modified.

Figure 4:
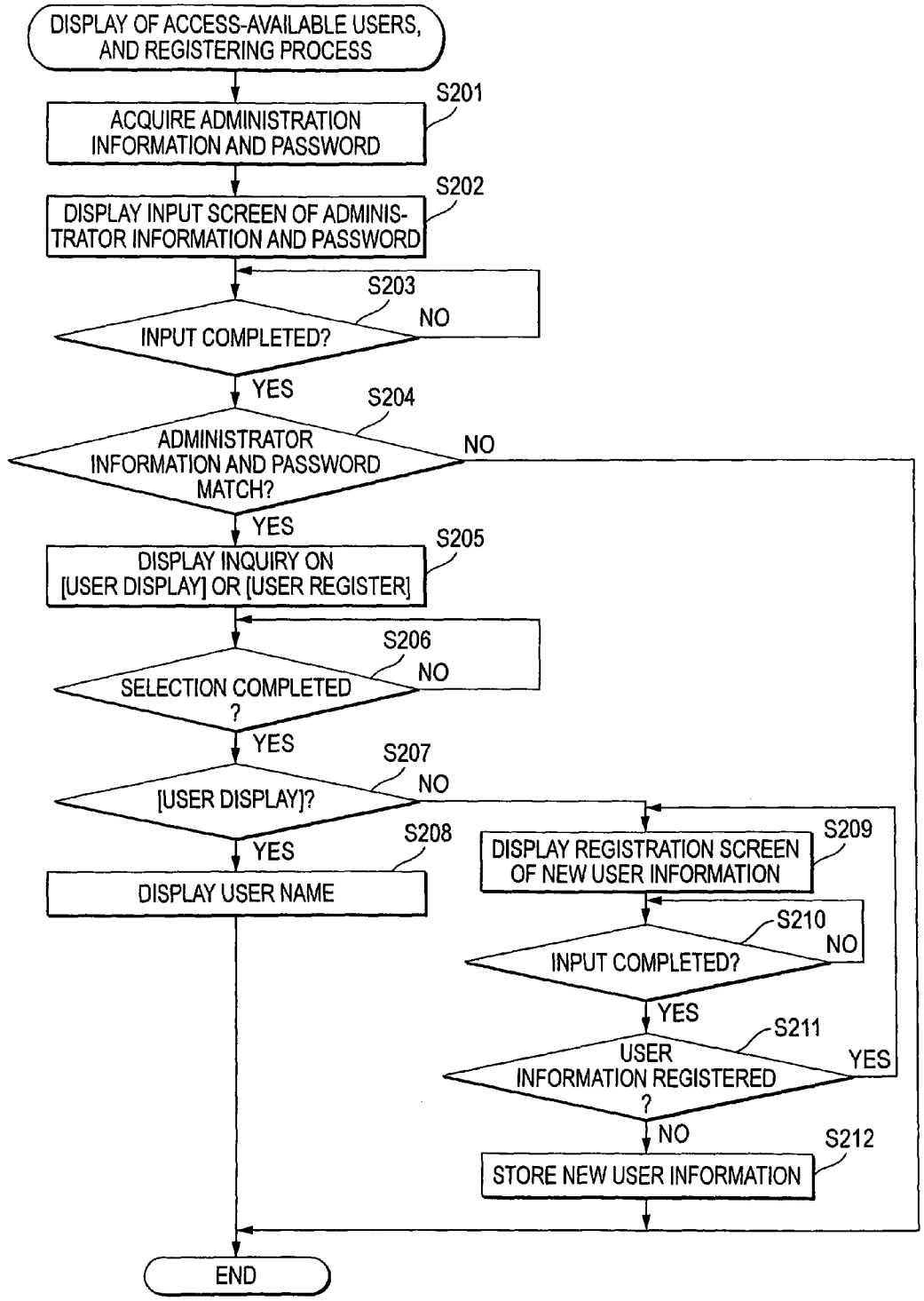
FIG. 4 is an exemplary flowchart showing display of access-available users and registration process.

With reference to FIG. 4, a description is given of display of access-available users and a registration process thereof. FIG. 4 is an exemplary flowchart showing display of a user able to use and a registration process thereof, which are executed by the CPU 21 of the multi-function device 1. The display of a user able to use and the registration process are executed where a function of [Display of a user able to use and registration process] is selected among a plurality of functions by the operation key 40 having been operated by a user (operator).

If the display of a user able to use and registration process are executed, the CPU 21 first acquires the administrator information stored in the administrator storing area 24a and the password stored in the password storing area 24b (S201).

Then, the input screen of the administrator information and password is displayed on the liquid crystal display 41 (S202), it is determined whether the administrator information and password have been input by a user (S203). The CPU 21 stands by until the user inputs the administrator information and the password (S203: NO).

If the administrator information and the password are determined to be input by the user in S203 (S203: YES), it is determined whether the input administrator information and password match with (correspond with) the administrator information and password acquired in the process of S201 (S204). If both of the administrator information and passwords are determined not to match with each other (S204: NO), it is determined that the display of a user able to use and register (modification) are not for a permitted user, and the process is terminated.

In contrast, if in the process of S204 both of the administrator information and the passwords match with each other (S204: YES), it is determined that the user is permitted to display and register the administrator information and password. An inquiry about whether the function to be executed is [User display] or [User register] is displayed on the liquid crystal display 41 (S205).

It is determined in the process of S206 whether either one of [User display] or [User register] is selected by the user (S206), and the CPU 21 stands by until either one of [User display] or [User register] is selected (S206: NO). If either one of [User display] or [User register] is selected (S206: YES), it is determined whether the function selected by the user is [User display] (S207).

If [User display] is selected by the user in the process of S207 (S207: YES), information indicating the user stored in the user storage area 24c (hereinafter called user information) is read, and the user name, etc., based on the read user information is displayed on the liquid crystal display 41 (S208), and the process is terminated. Further, the user name, etc., based on the user information read from the user storage area 24c may be printed on a recording medium (such as sheet) instead of the process of S208.

In contrast, if [User register] is selected by the user in the process of S207 (S207: NO), the screen of registering (inputting) new user information is displayed (S209), and it is determined whether the new user information is input by the user (S210).

In the process of S210, the CPU 21 stands by until the new user information is input by the user (S210: NO). If the new user information is input by the user (S210: YES), it is determined whether the input new user information has already been registered in the user storage area 24c (S211). If the new user information input by the user has already been registered in the user storage area 24c (S211: YES), the process returns to the process of S209 because no overlapping registration is available, and the registration screen of new user information is again displayed.

In contrast, if the new user information input by the user is not registered in the user storage area 24c (S211: NO), the input new user information is stored in the user storage area 24c (S212), and the process is terminated.

As described above, in the multi-function device 1, the user who knows the administrator information and password can display (output) the user information stored in the user storage area 24c, and can know the user information. For example, unless the current user information stored in the user storage area 24c is recognized, the user may attempt to doubly register the already stored user information, or the user information may not be stored even if the user attempted to store the user information. However, in the present aspect, the user information is displayed. Therefore, it is possible to know the user information stored in the user storage area 24c. Accordingly, the user information can be prevented from being doubly registered or not being stored.

Although a description is given of the process of displaying and registering the user able to use, a process of deleting the access-available users may be executed. In this aspect, a user may select [User display], [User register] and [User delete] in S207. If [User delete] is selected, the user information stored in the user storage area 24c is read and displayed on the liquid crystal display 41, the user is allowed to select the user information to be deleted from the displayed user information, and the user information selected by the user is deleted.

Figure 5:
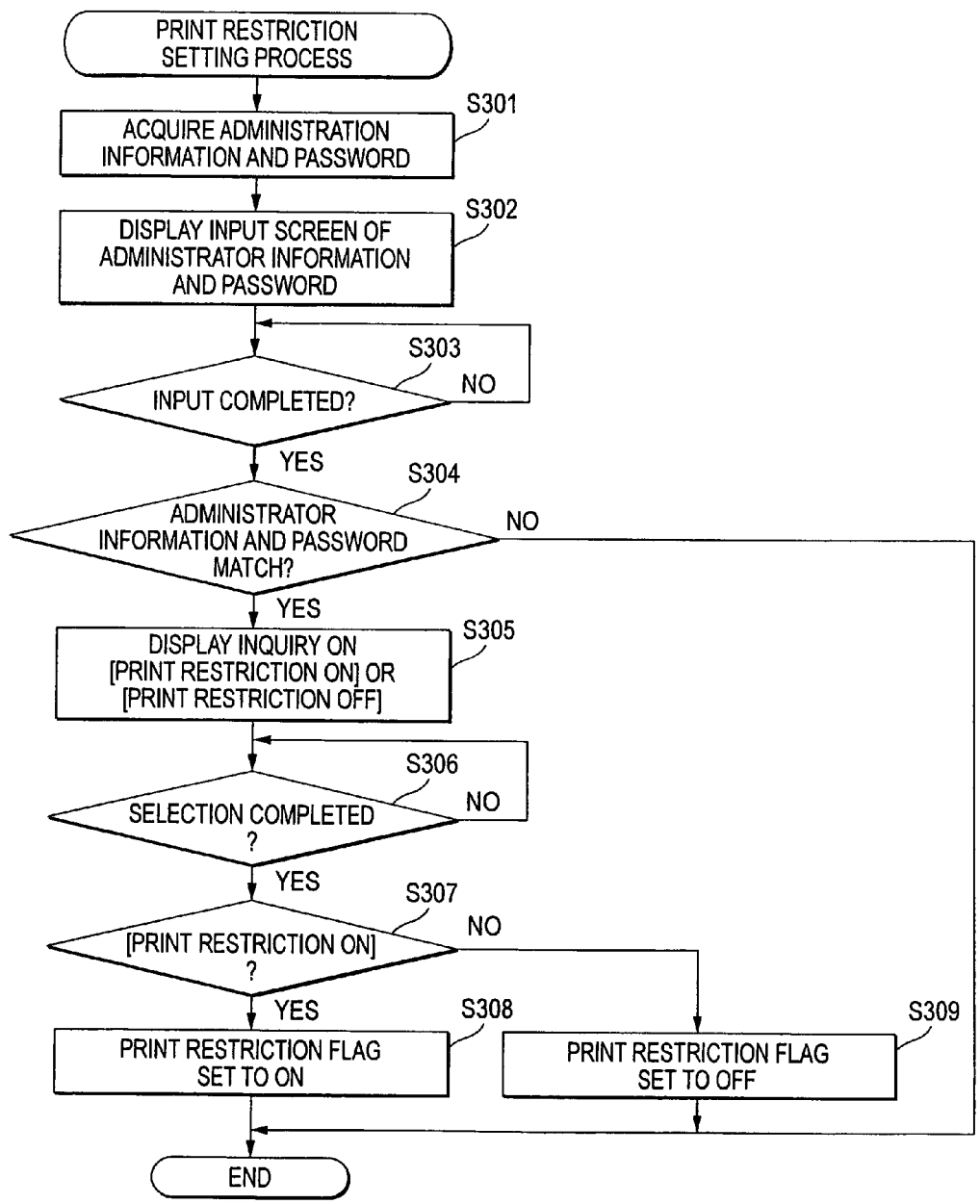
FIG. 5 is an exemplary flowchart showing a print restriction setting process.

Referring to FIG. 5, a description is given of a print restriction setting process. FIG. 5 is an exemplary flowchart showing the print restriction setting process executed by the CPU 21 of the multi-function device 1. The print restriction setting process is executed where the user (operator) operates the operation key 40 and selects the function of [Print restriction setting] among a plurality of functions.

If the print restriction setting process is executed, the CPU 21 acquires the administrator information stored in the administrator storing area 24a and the password stored in the password storing area 24b (S301).

Then, the input screen of the administrator information and the password is displayed on the liquid crystal display 41 (S302), and it is determined whether the user inputs the administrator information and the password (S303). The CPU 21 stands by until the user inputs the administrator information and the password (S303: NO).

If the administrator information and password is determined to have been input by the user in S303 (S303: YES), it is determined whether the input administrator information and password match with (correspond to) the administrator information and password acquired in the process of S301 (S304). If both of the administrator information and password are not matched (S304: NO), it is determined that the user is not a user permitted to modify the print restriction, and the process is terminated.

In contrast, if both of the administrator information and passwords are matched (S304: YES), it is determined that the user is permitted to modify the print restriction, and an inquiry about whether the function of print restriction is turned ON or OFF is displayed in the liquid crystal display 41 (S305). In S306, it is determined whether either one of [Print restriction ON] or [Print restriction OFF] is selected by the user (S306).

In the process of S306, the CPU 21 stands by until either one of [Print restriction ON] or [Print restriction OFF] is selected by the user (S306: NO). If either one of [Print restriction ON] or [Print restriction OFF] is selected by the user (S306: YES), it is determined whether the function selected by the user is [Print restriction ON] (S307).

If [Print restriction ON] is selected by the user in the process of S307 (S307: YES), the print restriction flag 24d is set to ON (S308), and the print restriction setting process is terminated. If [Print restriction OFF] is selected (S307: NO), the print restriction flag 24d is set to OFF (S309), and the print restriction setting process is terminated.

Incidentally, if [Print restriction ON] is set, a print-restricted state is brought about, wherein the users permitted to print and display are restricted in the index printing process and panel display process (described later). In contrast, if [Print restriction OFF] is set, a state where the print restriction is unlocked is brought about, wherein print and display can be executed with users not restricted. Therefore, although the user who knows the administrator information and password is able to set ON and OFF in regard to the print restriction, users who do not know the administration information and password cannot set ON and OFF in regard to the print restriction. That is, it is possible to prevent the user restriction from being easily unlocked with the print restriction turned OFF. Accordingly, important information can be prevented from being printed and displayed, and consumables such as ink, sheets and toner can be prevented from being consumed more than necessary.

The user who knows the administrator information and password sets ON and OFF in regard to the print restriction, usability can be improved in comparison with a case where ON and OFF of the print restriction are fixed.

With reference to FIG. 6 through FIG. 11, a description is given of an index printing process that is executed by the CPU 21 of the multi-function device 1. The index printing process is executed in a case where, with a memory card connected in the slot 72, a user (operator) operates the operation key 40 and selects the function of [Index printing]. With the index printing, summary of respective files stored in the memory card is printed.

Figure 11:
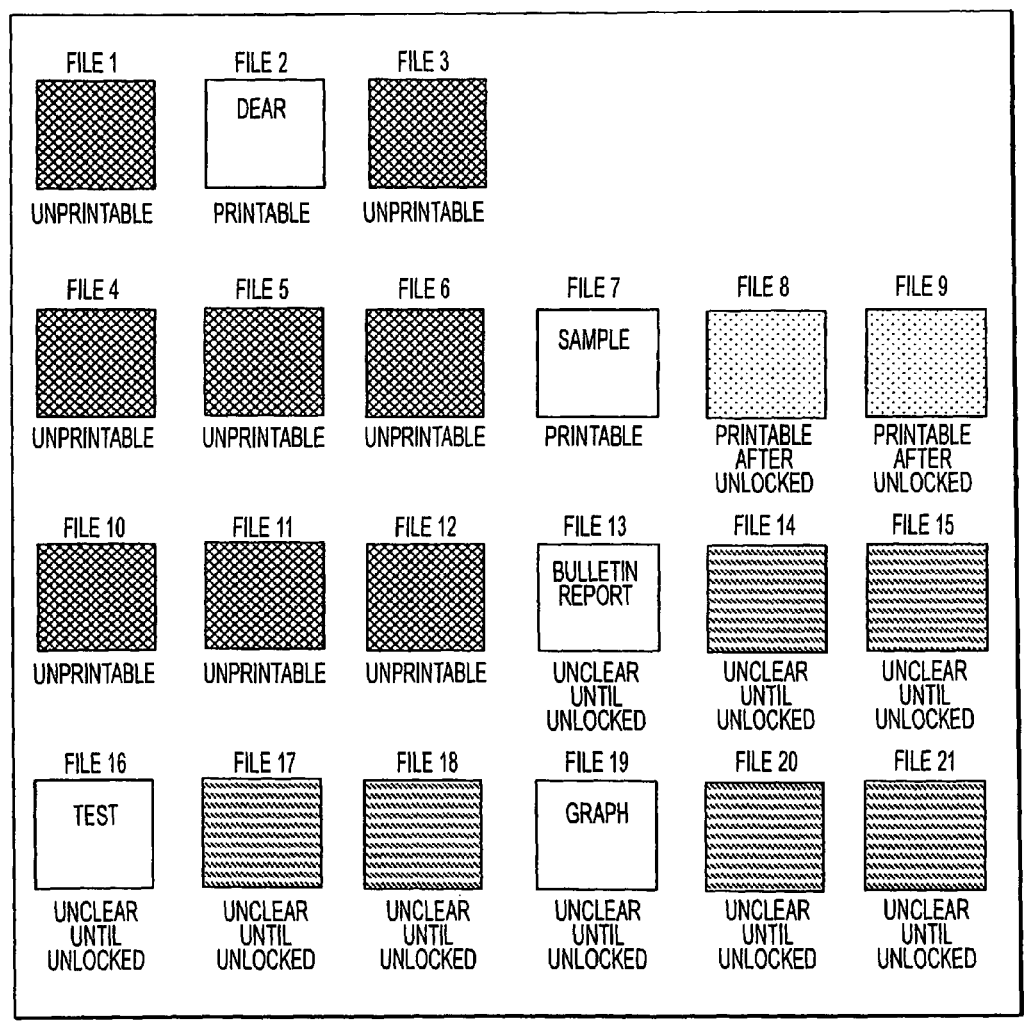

FIG. 9 is an exemplary schematic view showing one example of file information stored in the memory card. FIG. 10 is an exemplary view showing one example of the index printing with the print restriction turned OFF, and FIG. 11 is an exemplary view showing one example of the index printing with the print restriction turned ON.

Figure 6:
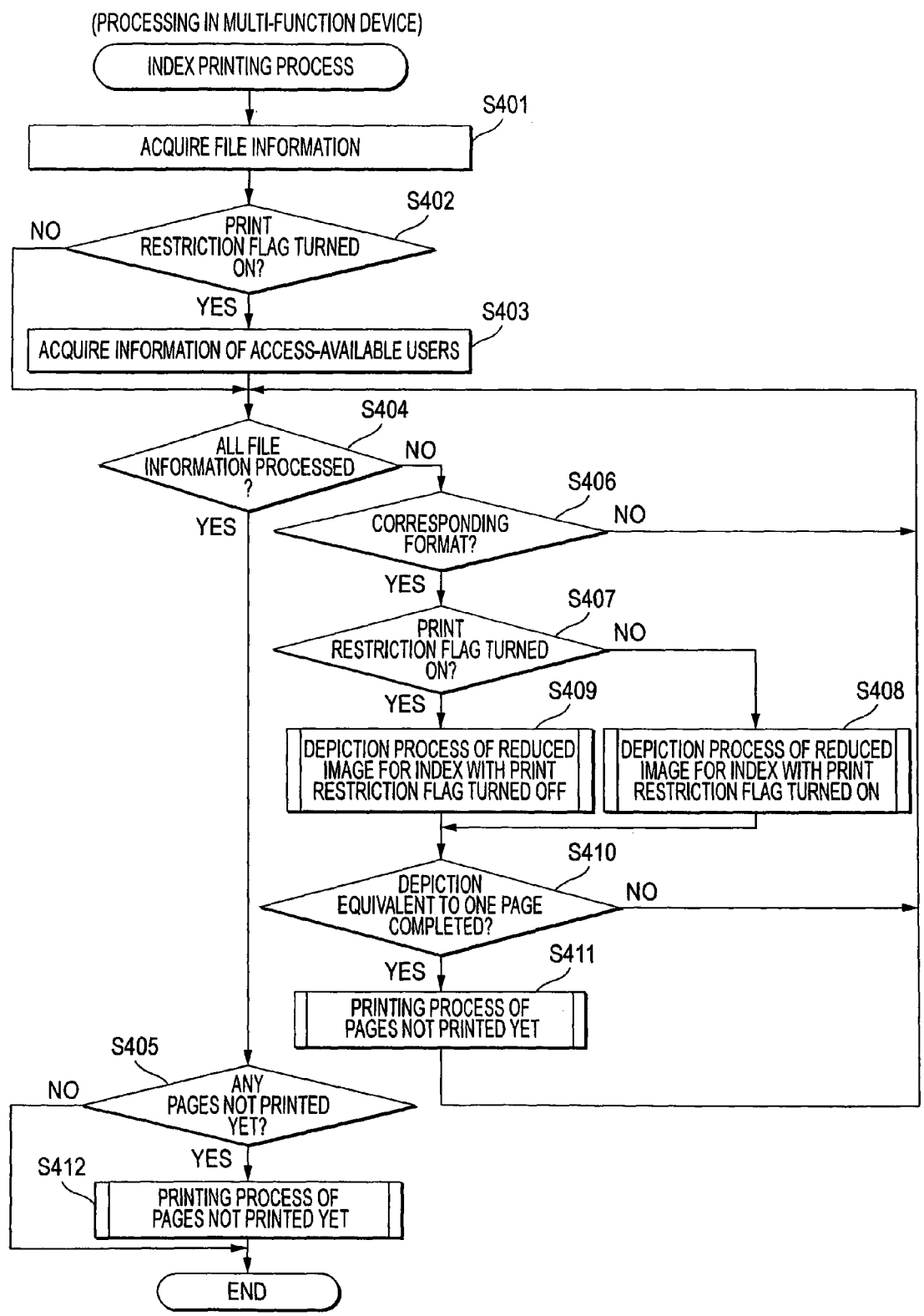
FIG. 6 is an exemplary flowchart showing an index printing process.

With reference to FIG. 6, a description is given of the index printing process. FIG. 6 is an exemplary flowchart showing the index printing process executed by the CPU 21 of the multi-function device 1.

If the index printing process is executed, the CPU 21 first acquires all of the file information stored in the memory cards connected to the slot 72 or in the memory of the connected peripheral unit (S401). In addition, in the process of S401, the acquired file information is stored in the file information storing area 23a.

In the process of S402, it is determined whether the print restriction flag 24d is set to ON (S402). If the print restriction flag 24d is set to ON (S402: YES), the user permitted to print is restricted. Thus, the information of access-available users, who are permitted to print, is acquired from the user storage area 24c (S403), and the process goes to the process of S404.

In contrast, in the process of S402, if the print restriction flag 24d is set to OFF (S402: NO), users permitted to print are not restricted. Thus, the process goes to the process of S404 without acquiring the information of users permitted to print in the process of S403.

In the process of S404, it is determined whether the processes of S405 through S411 described later has been terminated with respect to all of the file information stored in the file information storing area 23*a* (S404). If the processes for all of the file information have been terminated (S404: YES), it is determined whether there are pages which are not printed (S405). If there is a page which is not printed, a printing process of the page not printed is executed (S412). If there is no page which is not printed (S405: NO), the process is terminated as it is.

In the present aspect, the index printing is executed for each of recording media (e.g. sheet). Thus, there is a possibility for pages, which are not printed, to exist even if the processes for all of the file information have been terminated. Therefore, the process of S405 confirms whether there are pages which are not printed.

If the processes for all of the file information stored in the file information storing area 23*a* have not been terminated in S404 (S404: NO), the processes of S406 through S411 are repeated for each of the files. First, it is determined whether the files are based on the corresponding format (S406). If not based on the corresponding format (S406: NO), the process returns to the process of S404. In contrast, if based on the corresponding format (S406: YES), it is determined whether the print restriction flag 24*d* is set to ON (S407). If the print restriction flag 24*d* is set to OFF (S407: NO), a depicting process of a reduced image for index with the print restriction turned OFF is executed (S408). If the print restriction flag 24*d* is set to ON (S407: YES), a depicting process of a reduced image for index with the print restriction turned ON is executed (S409). Then, the process goes to the process of S410. Further, the depicting process of a reduced image for index with the print restriction turned OFF and the depicting process of a reduced image for index with the print restriction turned ON will be described later with reference to FIG. 7 and FIG. 8.

In the process of S410, it is determined whether depiction of file information equivalent to a page is set (S410). If the depiction of file information equivalent to a page is set (S410: YES), a printing process equivalent to one page is executed (S411). If the depiction of file information equivalent to one page is not set (S410: NO), the process returns to the process of S404 without executing the printing process equivalent to one page.

Herein, prior to description of the depiction process of a reduced image for index with the print restriction turned OFF, which is executed in the process of S408, and the depiction process of a reduced image for index with the print restriction turned ON, which is executed in the process of S409, a description is given of the file information stored in a memory card with reference to FIG. 9. In the present aspect, information of files 1 through 21 is stored in the memory card.

The user information shown in FIG. 9 indicates the users set in respective files 1 through 21. [NO] means that no user is set. [A] means that user A is set. [B] means that user B is set. Further, user information is encrypted in the files 13 through 21. The user information becomes unclear without decoding. The user information in the files 13 through 21 is set to any one of [NO], [A] and [B] as in the files 1 through 21.

In addition, the security shown in FIG. 9 is set to [NO] or [YES]. If the security is [NO], index printing and panel display are available without any restriction. If the security is [YES], the detail of restriction differs according to the types of security. In the present aspect, there are two types of security: one of which is [Readable] without unlocking the security; and the other of which is [Printable] without unlocking the security. In addition, [○] in the column of [Readable] without unlocking the security and in the column of [Printable] without unlocking the security means POSSIBLE, whereas [x] therein means IMPOSSIBLE.

Setting of the user information, security, [Readable] without unlocking the security, and [Printable] without unlocking the security in the files 1 through 21 are established by application software of a computer that prepared the files 1 through 21. General application software includes functions of setting user information, security, readability and printability. Using the functions, it is possible to set users permitted to print without adding new application software.

Incidentally, the user information, security, readability and printability may be set by the functions provided by the operating system incorporated in a computer instead of application software.

As shown in FIG. 9, files 1 through 3 are file information in which the security is set to [NO]. Files 4 through 12 are file information in which the user information is not encrypted although the security is set to [YES]. Files 13 through 21 are file information in which the security is set to [YES], and the user information is encrypted.

File 1 is set to [NO] for the user information and security. File 2 is set to [A] for the user information and [NO] for the security. File 3 is set to [B] for the user information and [NO] for the security.

File 4 is set to [NO] for the user information, [YES] for the security, [Readable] and [Printable] without unlocking the security. File 5 is set to [NO] for the user information, [YES] for the security, [Readable] and [Not Printable] without unlocking the security. File 6 is set to [NO] for the user information, [YES] for the security, [Not Readable] and [Not Printable] without unlocking the security.

File 7 is set to [A] for the user information, [YES] for the security, [Readable] and [Printable] without unlocking the security. File 8 is set to [A] for the user information, [YES] for the security, [Readable] and [Not Printable] without unlocking the security. File 9 is set to [A] for the user information, [YES] for the security, [Not Readable] and [Not Printable] without unlocking the security.

File 10 is set to [B] for the user information, [YES] for the security, [Readable] and [Printable] without unlocking the security. File 11 is set to [B] for the user information, [YES] for the security, [Readable] and [Not Printable] without unlocking the security. File 12 is set to [B] for the user information, [YES] for the security [Not Readable] and [Not Printable] without unlocking the security.

File 13 is set to [NO (encrypted)] for the user information, [YES] for the security, [Readable] and [Printable] without unlocking the security. File 14 is set to [NO (encrypted)] for the user information, [YES] for the security, [Readable] and [Not Printable] without unlocking the security. File 15 is set to [NO (encrypted)] for the user information, [YES] for the security, [Not Readable] and [Not Printable] without unlocking the security.

File 16 is set to [A (encrypted)] for the user information, [YES] for the security, [Readable] and [Printable] without unlocking the security. File 17 is set to [A (encrypted)] for the user information, [YES] for the security, [Readable] and [Not Printable] without unlocking the security. File 18 is set to [A (encrypted)] for the user information, [YES] for the security, [Not Readable] and [Not Printable] without unlocking the security.

File 19 is set to [B (encrypted)] for the user information, [YES] for the security, [Readable] and [Printable] without unlocking the security. File 20 is set to [B (encrypted)] for the user information, [YES] for the security, [Readable] and [Not Printable] without unlocking the security. File 21 is set to [B (encrypted)] for the user information, [YES] for the security, [Not Readable] and [Not Printable] without unlocking the security.

Although not illustrated, in order to distinguish reduced images of the respective files, it is assumed that with respect to the contents printed and displayed as the reduced images are, file 1 is set to [Preface], file 2 [Dear Mr. (Ms)], file 3 [Title], file 4 [Japanese Unexamined Patent Publication Hei], file 5 [Utility model], file 7 [Sample], file 8 [Trial], file [Estimate], file 11 [Bill], file 13 [Bulletin Report], file 14 [Report], file 16 [Test], file 17 [Demonstration], file 19 [Graph], and file 20 [Table], respectively.

Figure 7:
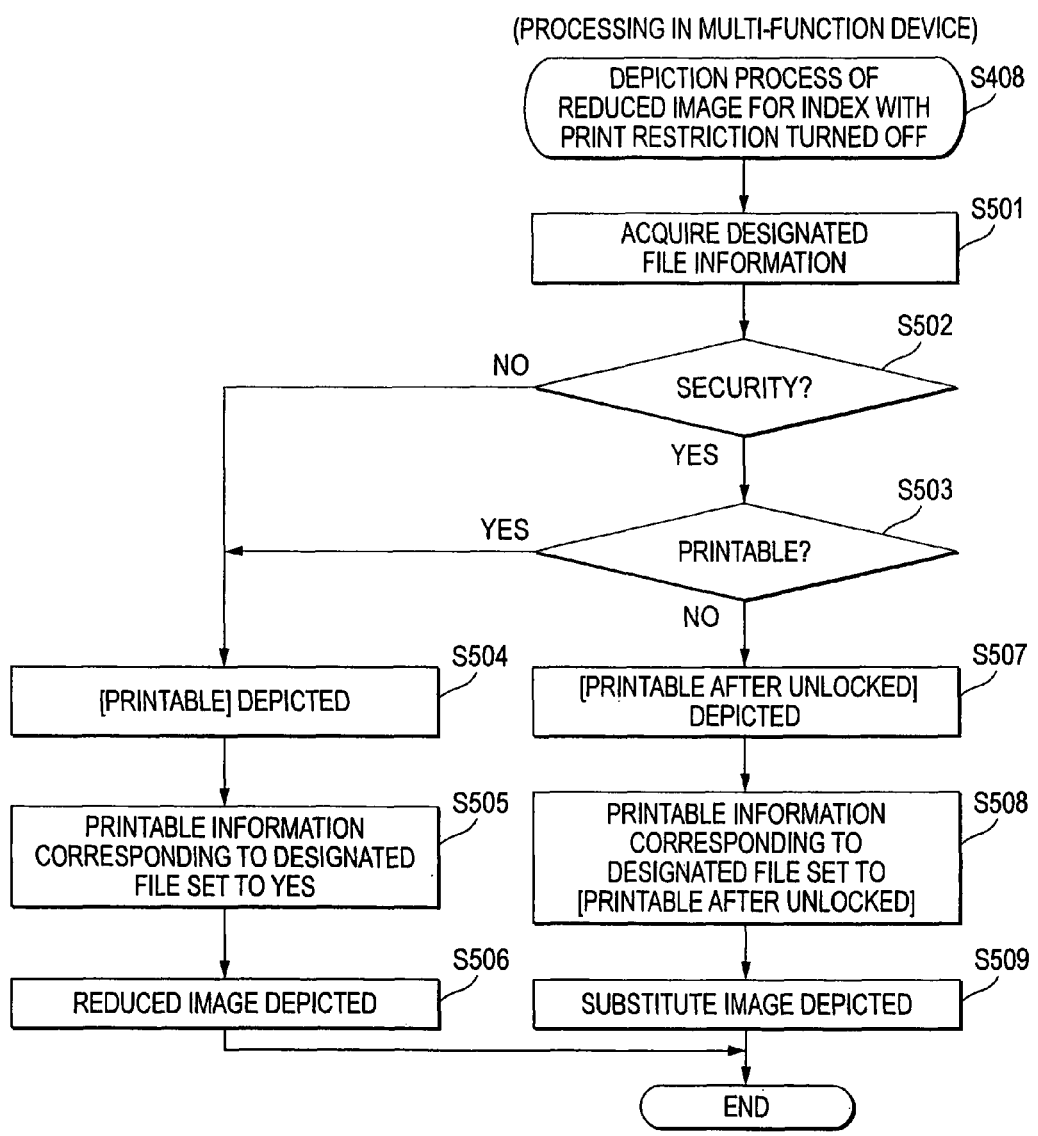
FIG. 7 is an exemplary flowchart showing a depiction process of a reduced image for index with print restriction turned OFF in an index printing process.

With reference to the flowchart of FIG. 7, and views of FIG. 9 and FIG. 10, a description is given of a depiction process of a reduced image for index with print restriction turned off, which is executed in the process of S408. FIG. 7 is an exemplary flowchart showing a depiction process of a reduced image for index with print restriction turned off, which is executed in the index printing process. Since no print restriction is given to the depiction process of a reduced image for index with print restriction turned off, the process executes index printing based on the file information.

When a depiction process of a reduced image for index with print restriction turned off is executed, the CPU 21 acquires the currently designated file information (S501). The process of S501 designates any one of files 1 through 24 and acquiring the file information. In the present aspect, the file information is sequentially acquired from file 1 whenever the process of S501 is executed.

In the process of S502, it is determined whether the file information acquired in the process of S501 is set to security YES (S502). Therefore, in the process of S502, if files 1 through 3 are designated as understood in FIG. 9, it is determined that the security is NO (S502: NO). If files 4 through 21 are designated, it is determined that the security is YES (S502: YES).

If it is determined in the process of S502 that the security is YES (S502: YES), it is next determined whether the file information is printable without unlocking the security (S503). Therefore, as shown in FIG. 9, it is determined that the file information of files 4, 7, 10, 13, 16 and 19 among files 4 through 21 are printable without unlocking the security (S503: YES), and it is determined that file information of files 5, 6, 8, 9, 11, 12, 14, 15, 17 18, and 20 among files 4 through 21 are not printable unless the security is unlocked (S503: NO).

If it is determined in the process of S502 that the security is set to NO (S502: NO) and it is determined in the process of S503 that the file information is printable without unlocking the security (S502: YES, S503: YES), the designated file information becomes printable without unlocking the security, wherein [Printable] is depicted (S504), and the printable information 23b of the designated file is set to [YES] (S505). The reduced image is depicted (S506), and the process is terminated.

Depiction of [Printable] in the process of S504 and depiction of the reduced image in the process of S506 are executed in files 1 through 3, and files 4, 7, 10, 13, 16 and 19 as described above. As shown in FIG. 10, [Printable] is depicted underneath files 1 through 4, 7, 10, 13, 16, and 19, and a reduced image of the respective files is depicted in the part enclosed by the square of the respective files.

In the process of S503, if it is determined that the file information is not printable unless the security is unlocked (S503: NO), the designated file information does not become printable after the security is unlocked. Therefore, [Printable after unlocked] is depicted (S507), and the printable information 23b of the designated file is set to [YES after unlocked] (S508), wherein a substitute image is depicted (S509), and the process is terminated.

Depiction of [Printable after unlocked] in the process of S507 and depiction of a substitute image in the process of S509 are executed in files 5, 6, 8, 9, 11, 12, 14, 15, 17, 18, and 21 as described above. As shown in FIG. 10, [Printable after unlocked] is depicted underneath files 5, 6, 8, 9, 11, 12, 14, 15, 17, 18, 20 and 21, and respective substitute images (e.g. a plurality of dots) are depicted in the part enclosed by the square of the respective files. The substitute image is set in order that the user is not caused to recognize the description of files which are not permitted to be printed unless the security is unlocked.

Figure 8:
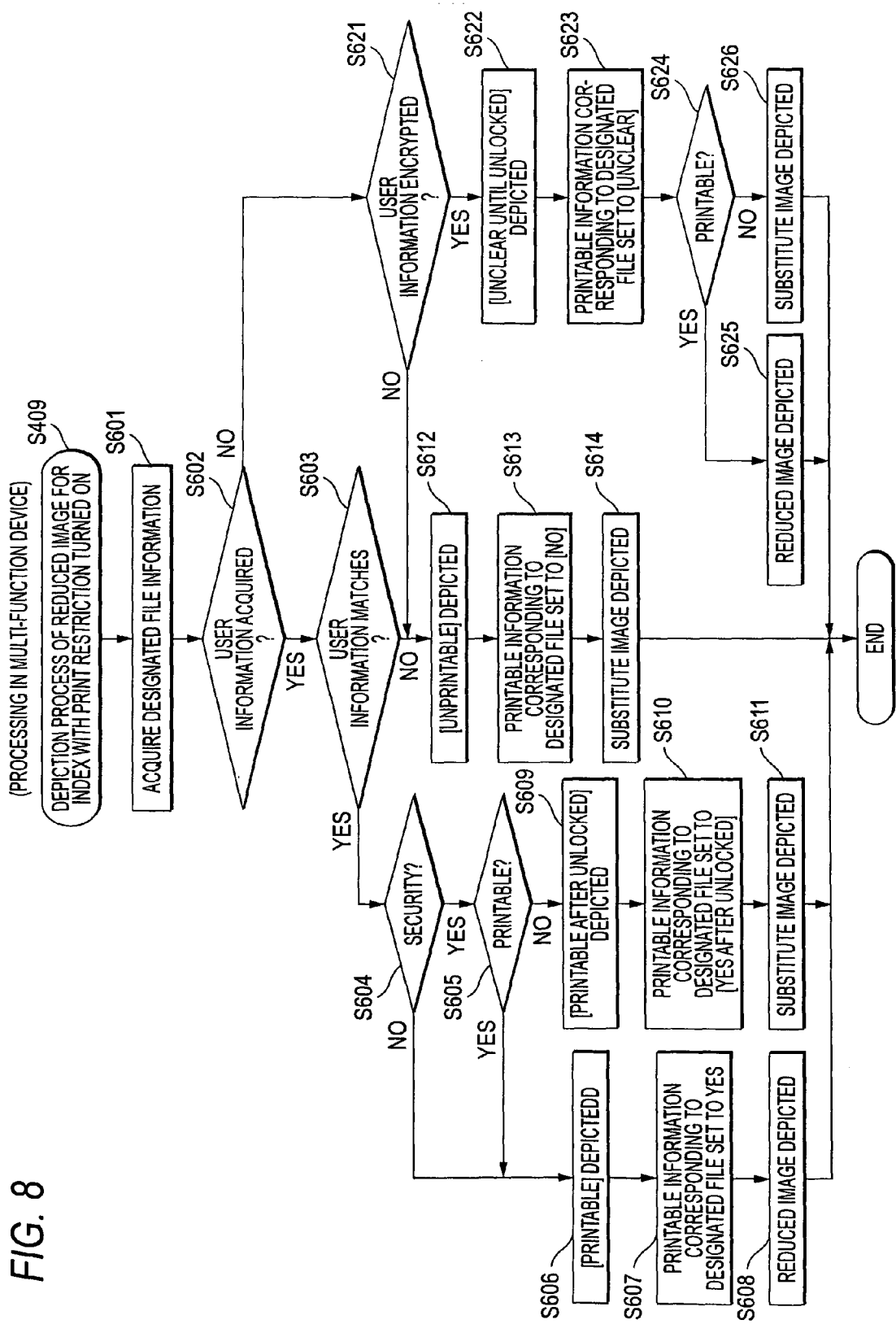
FIG. 8 is an exemplary flowchart showing a depiction process of a reduced image for index with the print restriction turned ON in the index printing process.

With reference to the flowchart of FIG. 8 and views of FIG. 9 and FIG. 11, a description is given of a depiction process of a reduced image for index with print restriction turned ON, which is executed in the process of S409. FIG. 8 is an exemplary flowchart showing a depiction process of reduced images for index with the print restriction turned ON, which is executed in the index printing process. In the depiction process, printing is restricted. That is, the depiction process, executes printing of a file for which a user (user information) permitted to print is matched.

If the depiction process of reduced images for index with print restriction turned ON is executed, the CPU 21 acquires the currently designated file information (S601). The process of S601 is a process of designating any one of files 1 through 24 and acquiring the file information as in the process of S501, wherein the file information is sequentially acquired from file 1 whenever the process of S601 is executed. If the designated file information is acquired by the process of S601, the user information, information indicating whether [readable] without unlocking the security, and information indicating whether [printable] without unlocking the security, which are included in the designated file information, are read (example of reading unit and process of reading identification information).

In the process of S602, it is determined whether user information is acquired from the designated file (S602). If the user information is acquired (S602: YES), the process goes to the process of S603. If no user information is acquired (S602: NO), the process goes to the process of S621. Files from which the user information can be acquired are files 2, 3, and 7 through 12 shown in FIG. 9. Files from which the user information cannot be acquired are files 1, 4 through 6 where the user information is [NO], and files 13 through 21 where the user information are encrypted.

It is determined in the process of S603 whether the user information acquired from the designated file information matches with the user information stored in the user storage area 24c (that is, whether the user is a user able to use) (S603). If both of the user information match with each other (S603: YES), the process goes to the process of S604, and if not (S603: NO), the process goes to the process of S612.

In the present aspect, the user information stored in the user storage area 24c is only information indicating the user A. Therefore, in the process of S603, as understood in FIG. 9, it is determined that both of the user information match with each other in files 2, 7 through 9 among the files 2, 3 and 7 through 12 (S603: YES), whereas both of the user information are not matched in files 3 and 10 through 12 thereamong (S603: NO).

In the process of S604, it is determined whether the file information acquired in the process of S601 is set to Security Yes (S604). Therefore, as understood in FIG. 9, it is determined that files 7 through 9 among files 2, and 7 through 9 are set to security YES (S604: YES), whereas it is determined that file 2 is set to security NO (S604: NO).

If it is determined that the files are set to security YES (S604: YES), it is next determined whether [printable] without unlocking the security (S605). Therefore, as understood in FIG. 9, it is determined that file 7 among files 7 through 9 is printable without unlocking the security (S605: YES), whereas it is determined that files 8 and 9 do not become printable after the security is unlocked (S605: NO).

If it is determined in the process of S604 that the security is set to NO (S604: NO) or in the process of S605 that a file is printable without unlocking the security (S604: YES, S605: YES), the designated file information becomes printable. Therefore, [Printable] is depicted (S606), the printable information 23b of the designated file is set to [YES] (S607), the reduced image is depicted (S608), and the process is terminated.

As described above, depiction of [Printable] in the process of S606 and depiction of reduced images in the process of S608 are executed in files 2 and 7. As shown in FIG. 11, [Printable] is depicted underneath the files 2 and 7, and reduced images of the respective files are depicted in the part enclosed by the square of the files 2 and 7.

In the process of S605, if the file information is determined not to be printable without unlocking the security (S605: NO), the designated file information does not become printable unless the security is unlocked. Therefore, [Printable after unlocked] is depicted (S609), the printable information 23b of the designated file is set to [YES after unlocked] (S610), a substitute image is depicted (S611), and the process is terminated.

Depiction of [Printable after unlocked] in the process of S609 and depiction of a substitute image in the process of S611 are executed in files 8 and 9 as described above. As shown in FIG. 11, [Printable after unlocked] is depicted underneath the files 8 and 9, and a substitute image (e.g. a plurality of dots) is depicted in the part enclosed by the square of the respective files.

In the process of S603, if the user information acquired from the designated file information does not match with the user information stored in the user storage area 24c (S603: NO), the user information of the designated file becomes other than [A] and the designated file becomes unprintable. Therefore, [Unprintable] is depicted (S612), the printable information 23b of the designated file is set to [NO] (S613), a substitute image is depicted (S614), and the process is terminated.

Depiction of [Unprintable] in the process of S612 and depiction of a substitute image in the process of S613 are executed in files 3 and 10 through 12 as described above. As shown in FIG. 11, [Unprintable] is depicted underneath the files 3, and 10 through 12, and a substitute image (e.g. lattice-shaped image) is depicted in the part enclosed by the square of the respective files.

In the process of S602, if no user information can be acquired from the designated file (S602: NO), it is determined whether the user information is encrypted (S621). Therefore, in the process of S621, as understood in FIG. 9, it is determined that the user information of files 1, and 4 through 6 among files 1, 4 through 6, and 13 through 21 are not encrypted (S621: NO), and it is determined that the user information in files 13 through 21 are encrypted (S621: YES).

If it is determined in the process of S621 that the user information is not encrypted (S621: NO), no user information is set ([NO]), and the user information becomes unprintable. Thus, the process goes to the process of S612, [Unprintable] is depicted, at the same time, the printable information of the designated file is set to [NO], and a substitute image is depicted. Then, the process is terminated.

In this case, depiction of [Unprintable] in the process of S612 and depiction of the substitute image in the process of S613 are executed in files 1 and 4 through 6 as described above. As shown in FIG. 11, [Unprintable] is depicted underneath the files 1 and 4 through 6, and the substitute image (e.g. lattice-shaped image) is depicted in the part enclosed by the square of the respective files.

In contrast, if it is determined in the process of S621 that the user information is encrypted (S621: YES), the user information cannot be acquired because the user information is encrypted. Therefore, until the encryption is unlocked, it is unclear whether the user information is printable. Accordingly, [Unclear until unlocked] is depicted (S623), and the printable information 23b of the designated file is set to [Unclear] (S622). Then, the process goes to the process of S624.

The files for which the printable information 12b is set to [Unclear] will become printable by the printing process described later by unlocking the security.

In the process of S624, it is determined whether the file for which the user information is encrypted is printable without unlocking the security (S624). Therefore, in the process of S624, as understood in FIG. 9, it is determined that files 13, 16 and 19 among the files 13 through 21 are printable without unlocking the security (S624: YES), and it is determined that files 14, 15, 17, 18, 20 and 21 are unprintable unless the security is unlocked (S623: NO).

If it is determined in the process of S624 that the files are printable without unlocking the security (S624: YES), a reduced image of the designated file is depicted (S625), and the process is terminated.

Depiction of [Unclear until unlocked] in the process of S622 and depiction of reduced images in the process of S625 are executed in files 13, 16 and 19 as described above. As shown in FIG. 11, [Unclear until unlocked] is depicted underneath the files 13, 16 and 19, and the reduced images of the respective files are depicted in the part enclosed by the square of the respective files.

In contrast, if it is determined in the process of S624 that the file for which the user information is encrypted is not printable without unlocking the security (S624: NO), a substitute image is depicted (S626), and the process is terminated.

Depiction of [Unclear until unlocked] in the process of S622 and depiction of the substitute image in the process of S626 are executed in files 14, 15, 17, 18, 20 and 21 as described above. As shown in FIG. 11, [Unclear until unlocked] is depicted underneath the files 14, 15, 17, 18, 20 and 21, and respective substitute images (e.g. a plurality of lines) are depicted in the part enclosed by the square of the respective files.

As described in the index printing process above, if a user permitted to print is not restricted, [Printable] is displayed, and at the same time, reduced images of the respective files are printed. If the security is set to YES and the files are not printable until the security is unlocked, it is configured that [Printable after unlocked] is displayed together with displaying of the substitute image, and a user is not caused to recognize the user information. Therefore, the user can recognize a printable file by checking the index printing. In addition, in regard to the file for which [Printable after unlocked] is set, the substitute image is displayed. Accordingly, it is possible to prevent an outsider from knowing the information of the files.

Further, if a user permitted to print is restricted, [Unprintable], [Printable], [Printable after unlocked] and [Unclear until unlocked] are displayed. Accordingly, it is possible for a user to be caused to recognize a file that becomes printable, a file that becomes unprintable, a file that becomes printable if the security is unlocked, and a file for which the user information is encrypted and it is unclear whether printable until the security is unlocked. Further, substitute images are depicted for files that become [Unprintable], [Printable after unlocked], and [Unclear until unlocked]. Accordingly, it is possible for an outsider to know the information of the files.

Figure 13:
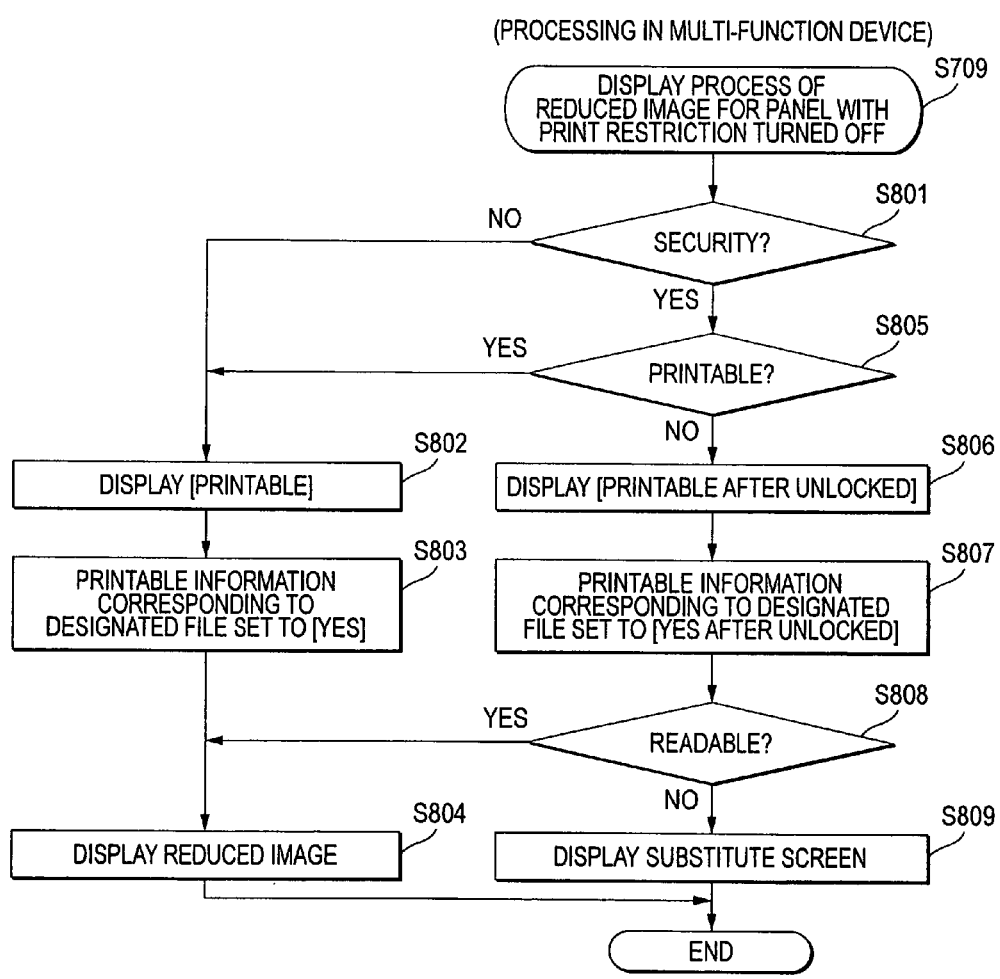
FIG. 13 is an exemplary flowchart showing a depiction process of a reduced image for panel with the print restriction turned OFF in the panel displaying process.
Figure 14:
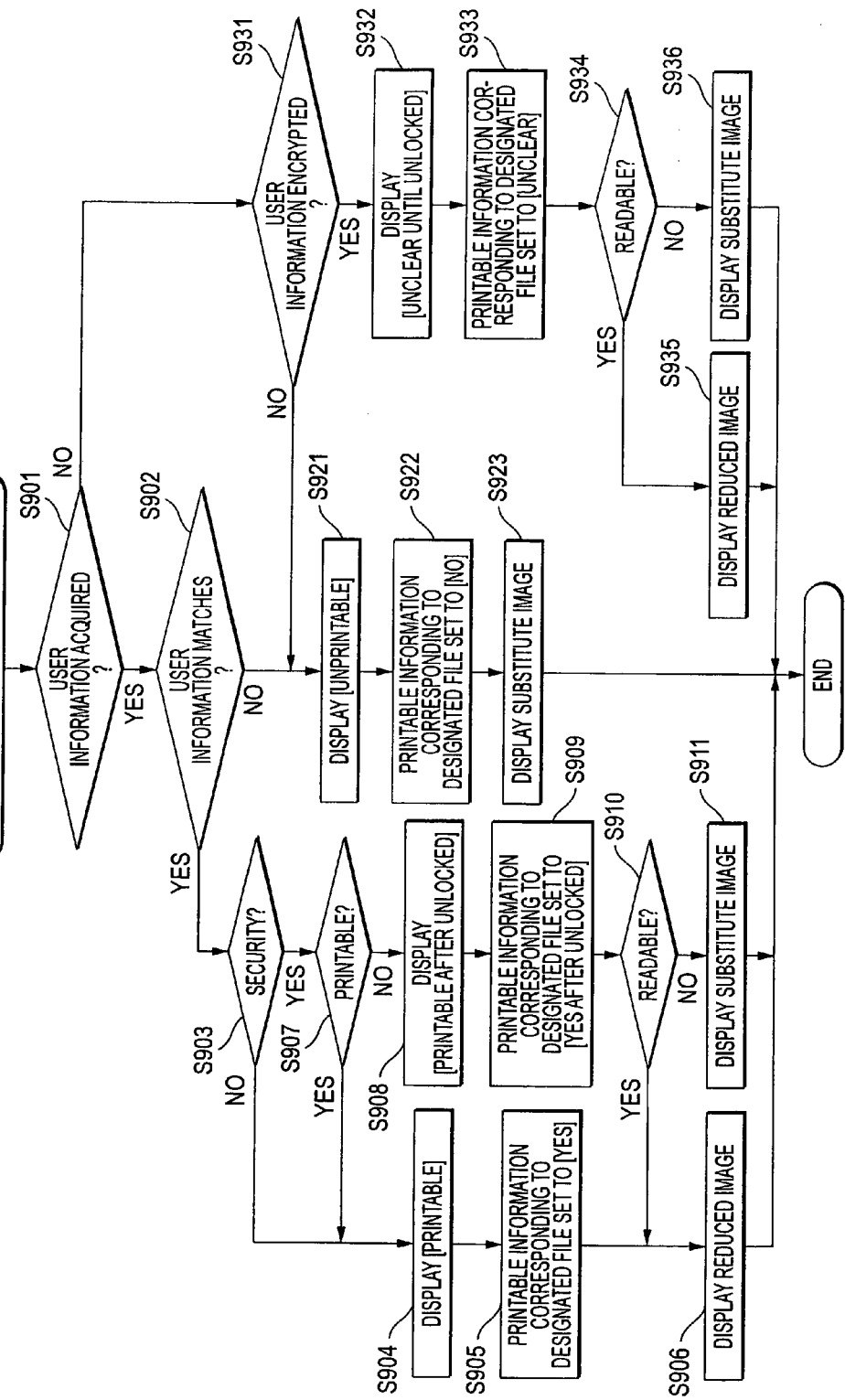
FIG. 14 is an exemplary flowchart showing a depiction process of a reduced image for panel with the print restriction turned ON in the panel displaying process.
Figure 15:
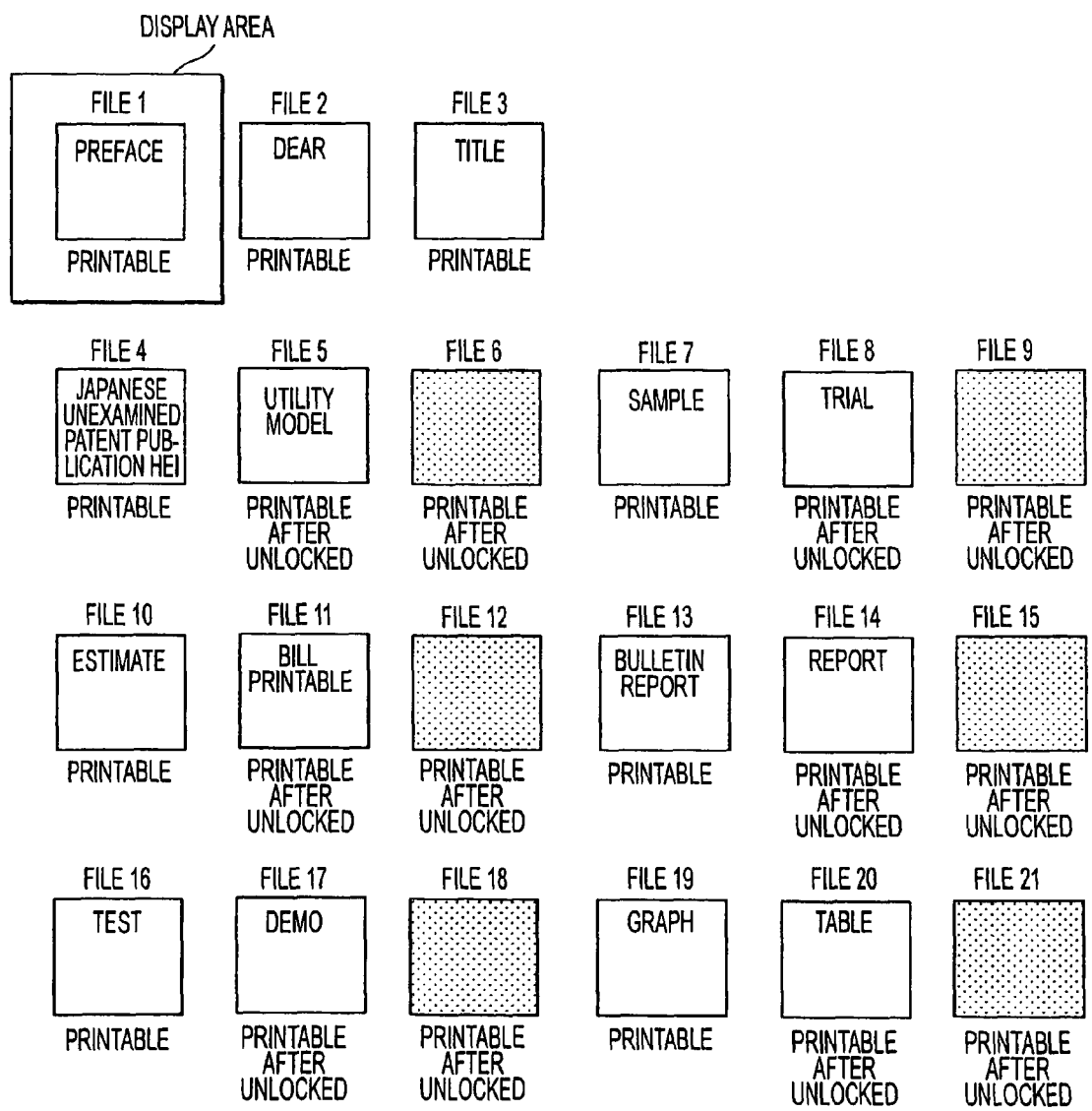
FIG. 15 is an exemplary view showing one example of panel display with the print restriction turned OFF.
Figure 16:
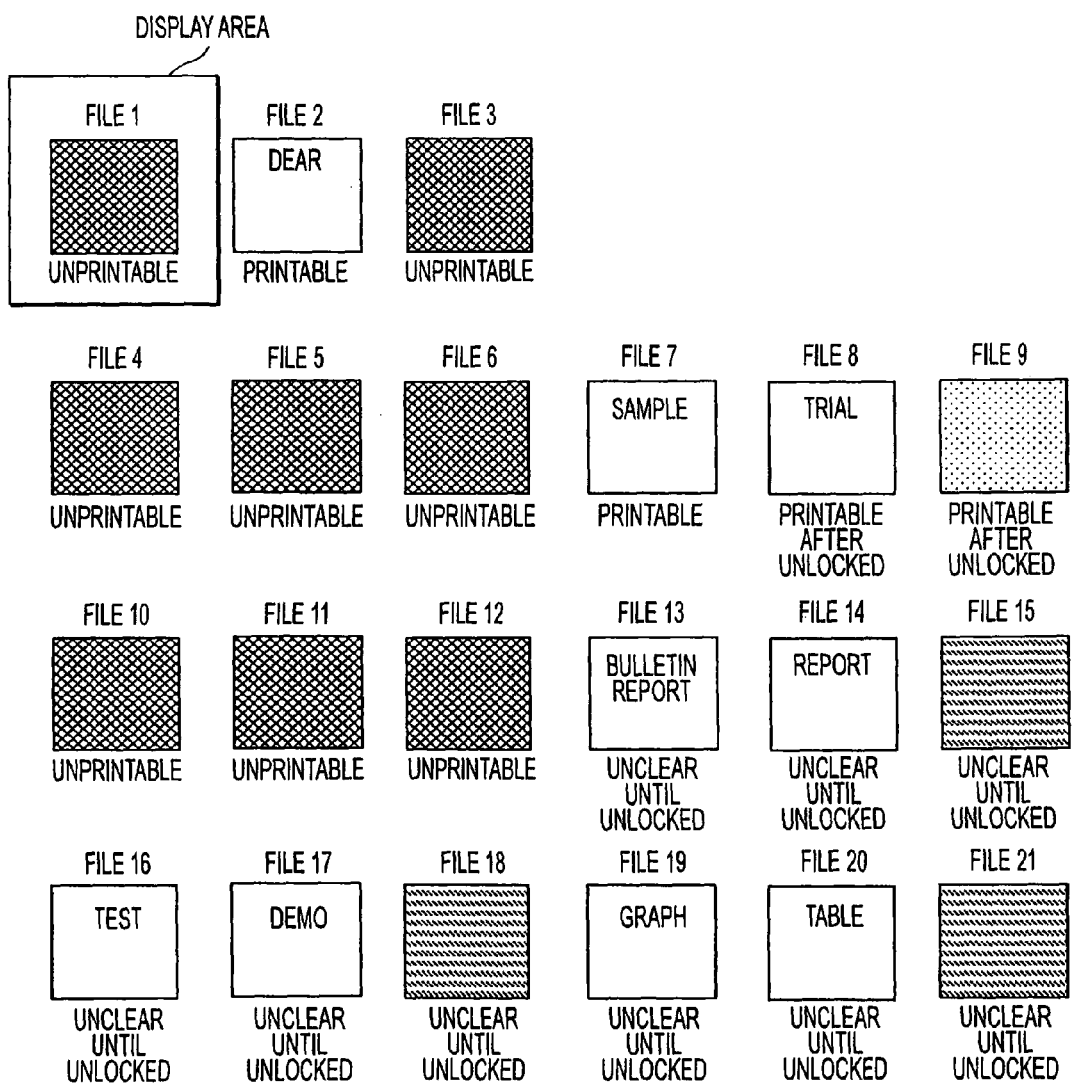

With reference to FIG. 9 and FIG. 12 through FIG. 16, a description is given of a case where file information stored in a memory card connected to the slot 72 or in a memory of the connected peripheral unit. is not printed in regard to index but is displayed on the panel of the liquid crystal display 41. FIG. 15 is an exemplary view showing one example of panel display with the print restriction turned OFF. FIG. 16 is an exemplary view showing one example of panel display with the print restriction turned ON.

Figure 12:
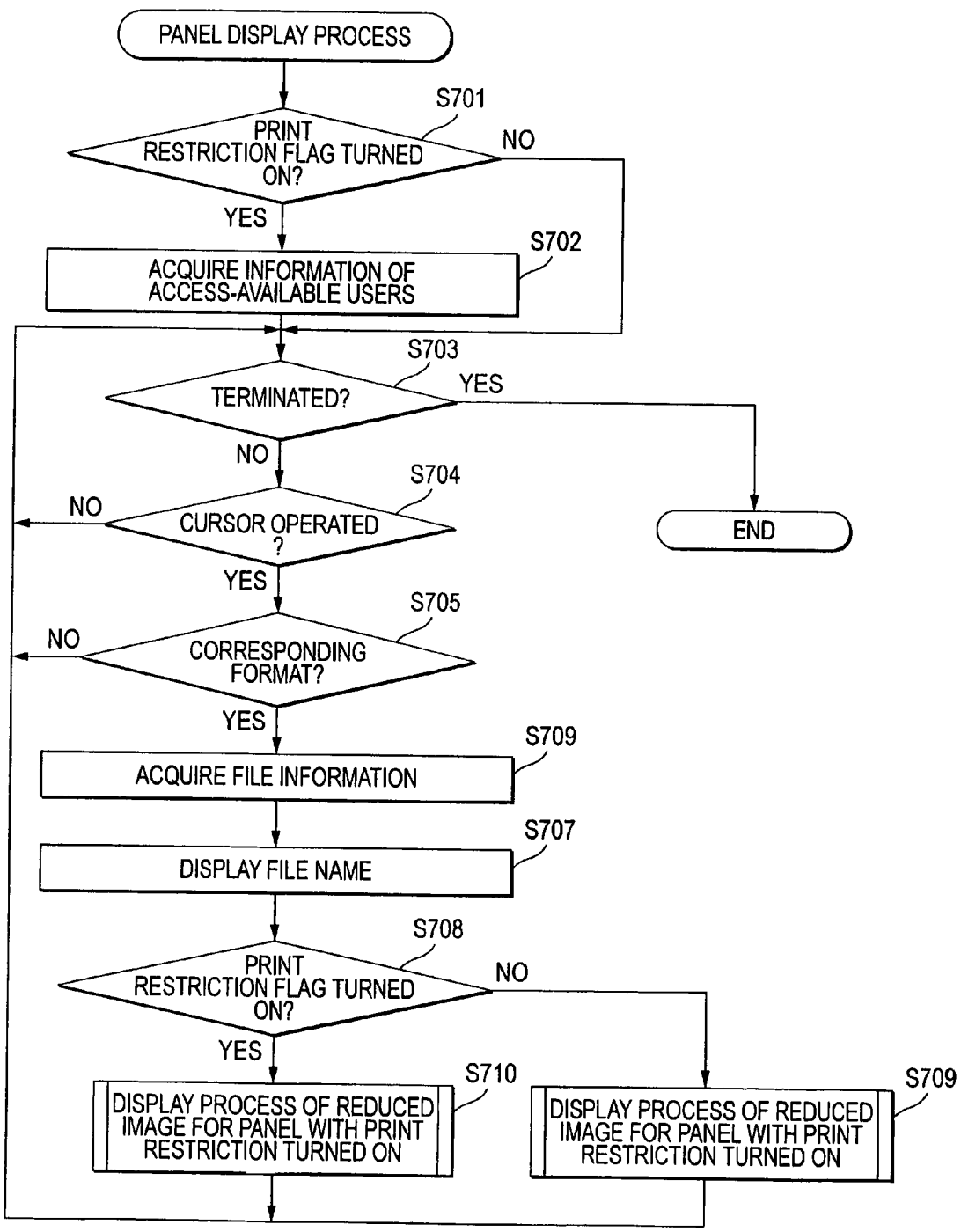
FIG. 12 is an exemplary flowchart showing a panel display process.

FIG. 12 is an exemplary flowchart showing a panel display process executed by the CPU 21 of the multi-function device 1. The panel display process is executed when a user (operator) operates the operation key 40 and selects a function of [Panel display] among a plurality of functions. The panel display displays file information on the liquid crystal display 41. The file information is displayed in display area shown in FIG. 15 or FIG. 16 in the liquid crystal display 41 file by file in regard to the file designated by the user. The file information of files that are not designated may not be displayed at all or may be displayed to show existence of files by only characters or with a small display. Modification of the file information displayed in the liquid crystal display 41 can be executed whenever operating the cursor key (not illustrated) of the operation key 40.

When the panel display process is executed, it is determined whether the print restriction flag 24d is set to ON (S701). If the print restriction flag 24d is set to ON (S701: YES), a user permitted to print is restricted. Therefore, access-available user information for which printing is permitted is acquired from the user storage area 24c (S702), and the process goes to the process of S703.

In contrast, if the print restriction flag 24d is set to OFF in the process of S701 (S701: NO), the user permitted to print is not restricted. Thus, the process goes to the process of S703 without acquiring the user information for which printing is permitted in the process of S702.

In the process of S703, it is determined whether termination of the panel display is selected (S703). If termination is selected by the user (S703: YES), the process is terminated.

In contrast, if termination is not selected by the user in the process of S703 (S703: NO), the user operates the cursor, and it is determined whether the file information displayed next (or the file information displayed at first) is selected (S704). If the cursor is not operated by the user in the process of S704 (S704: NO), the process goes to the process of S703, and the processes of S703 and S704 are repeated until termination or the next file information is selected by the user.

In the process of S704, if the user operates the cursor and selects the next file information (S704: YES), it is determined whether the selected file is the corresponding format (S705). If the selected file is not the corresponding format (S705: NO), the process returns to the process of S703. In contrast, if the selected file is the corresponding format (S705: YES), the selected file information is acquired (S706), and the file name is displayed on the liquid crystal display 41 in order for the user to recognize the selected file information (S707). If the selected file information is acquired in the process of S706, the user information included in the selected file information, information indicating whether the file information is readable without unlocking the security, and information indicating whether printable without unlocking the security are read (example of reading unit and process of reading identification information).

In the process of S708, it is determined whether the print restriction flag 24d is set to ON (S708). If the print restriction flag 24d is set to OFF (S708: NO), a display process of a reduced image for panel with the print restriction turned OFF is executed (S709). If the print restriction flag 24d is set to ON (S708: YES), a display process of a reduced image for panel with the print restriction turned ON is executed (S710). Then, the process returns to the process of S703, and the processes S705 through S710 are repeated until termination is selected by the user.

With reference to the flowchart of FIG. 13, and FIG. 9 and FIG. 15, a description is given of a display process of reduced images for panel with the print restriction turned OFF, which is executed in the process of S709. FIG. 13 is an exemplary flowchart showing a display process of reduced images for panel with the print restriction turned OFF, which is executed in the panel display process.

If the display process of a reduced image for panel with the print restriction turned OFF is executed, it is determined whether the information acquired in the process of S706 is set to Security YES (S801). Therefore, in the process of S801, as understood in FIG. 9, it is determined that files 1 through 3 are set to Security NO (S801: NO), and it is determined that files 4 through 21 are set to Security YES (S801: YES).

If it is determined in the process of S801 that files are set to Security YES (S801: YES), it is next determined whether printable without unlocking the security (S805). Therefore, in the process of S805, as understood in FIG. 9, it is determined that files 4, 7, 10, 13, 16 and 19 among the files 4 through 21 are printable without unlocking the security (S805: YES), and it is determined that files 5, 6, 8, 9, 11, 12, 14, 15, 17, 18, 21, and 21 among the files 4 through 21 do not become printable unless the security is unlocked (S805: NO).

In the process of S801, if it is determined that files are set to Security NO (S801: NO), and in the process of S805, it is determined that files are printable without unlocking the security (S801: YES, S805: YES), the selected files become printable without unlocking the security. Therefore, [Printable] is displayed (S802), the printable information 23b corresponding to the selected files are set to YES (S803), the reduced images of the files are displayed (S804), and the process is terminated.

Display of [Printable] in the process of S802 and display of reduced images in the process of S804 are executed, as described above, in files 1 through 3 and files 4, 7, 10, 13, 16 and 19. As shown in FIG. 15, [Printable] is displayed underneath the files 1 through 3 and files 4, 7, 10, 13, 16 and 19, and a reduced image of the respective files is displayed in the part enclosed by the square of the respective files.

In the process of S805, if it is determined that files are not printable unless the security is unlocked (S805: NO), the selected file information does not become printable unless the security is unlocked. Thus, [Printable after unlocked] is displayed (S806), the printable information 23b corresponding to the selected file is set to [Printable after unlocked] (S807), and it is determined whether the file information is readable without unlocking the security (S808).

In the process of S808, if it is determined that files are readable without unlocking the security (S808: YES), the process goes to the process of S804, and if not readable (S808: NO), a substitute image is displayed (S809), and the process is terminated. In the process of S808, as understood in FIG. 9, it is determined that files 5, 8, 11, 14, 17 and 20 among files 5, 6, 8, 9, 11, 12, 14, 15, 17, 18, 20 and 21 are readable without unlocking the security (S808: YES), and it is determined that files 6, 9, 12, 15, 18 and 21 are not readable (S808: NO).

Display of [Printable after unlocked] in the process of S806 and display of reduced image in the process of S804 are executed in files 5, 8, 11, 14, 17 and 20 as described above. As shown in FIG. 15, [Printable after unlocked] is depicted underneath the files 5, 8, 11, 14, 17 and 20, and reduced images of the respective files are displayed in the part enclosed by the square of the respective files.

In contrast, display of [Printable after unlocked] in the process of S806 and display of substitute image in the process of S809 are executed in files 6, 9, 12, 15, 18 and 21 as described above. As shown in FIG. 15, [Printable after unlocked] is depicted underneath the files 6, 9, 12, 15, 18 and 21, and substitute images (e.g. a plurality of dots) of the respective files are displayed in the part enclosed by the square of the respective files.

With reference to the flowchart of FIG. 14, and FIG. 9 and FIG. 16, a description is given of a display process of reduced images for panel with the print restriction turned ON, which is executed in the process of S710. FIG. 14 is an exemplary flowchart showing a display process of reduced images for panel with the print restriction turned ON, which is executed in the panel display process.

When a display process of reduced images for panel with the print restriction turned ON is executed, it is determined whether the user information of the selected file is acquired (S901). If the user information can be acquired (S901: YES), the process goes to the process of S902, and if the user information cannot be acquired (S901: NO), the process goes to the process of S931. Files for which the user information can be acquired are files 2, 3, and 7 through 12 as understood in FIG. 9, and files for which the user information cannot be acquired are files 1, and 4 through 6 in which the user information becomes [NO], and files 13 through 21 in which the user information is encrypted.

In the process of S902, it is determined whether the user information acquired from the selected file matches with the user information stored in the user storage area 24*c* (that is, whether the user is a user able to use) (S902). If both of the user information match with each other (S902: YES), the process goes to the process of S903. If both of the user information are not matched (S902: NO), the process goes to the process of S921. Incidentally, as described above, in the present aspect, the users permitted to print are set to only [A]. Accordingly, it is determined that both of the user information are matched in files 2, and 7 through 9 among the files 2, 3, and 7 through 12 (S902: YES), whereas it is determined that both of the user information are not matched in files 3 and 10 through 12 (S902: NO).

In the process of S903, it is determined whether the file information of the selected files is set to Security YES (S903). Therefore, in the process of S903, as understood in FIG. 9, it is determined that file 2 among the files 2, and 7 through 9 is set to Security NO (S903: NO), and it is determined that files 7 through 9 are set to Security YES (S903: YES).

In the process of S903, if it is determined that the file information is set to Security YES (S903: YES), it is next determined whether it is printable without unlocking the security (S907). Therefore, in the process of S907, as understood in FIG. 9, it is determined that file 7 is printable without unlocking the security (S907: YES), and it is determined that files 8 and 9 do not become printable unless the security is unlocked (S907: NO).

In the process of S903, if it is determined that files are set to Security NO (S903: NO) or in the process of S907, it is determined that files are printable without unlocking the security (S903: YES, S907: YES), the selected files are printable without unlocking the security. Therefore, [Printable] is displayed (S904), and printable information 23*b* corresponding to the selected files is set to [YES] (S905), and the reduced image of the file is displayed. Then, the process is terminated.

Further, display of [Printable] in the process of S904 and display of reduced image in the process of S906 are executed in files 2 and 7 as described above. As shown in FIG. 16, [Printable] is displayed underneath the files 2 and 7, and reduced images of the respective files are displayed in the part enclosed by the square of the respective files.

In the process of S907, if it is determined that the file information is not printable without unlocking the security (S907: NO), the selected file information does not become printable unless the security is unlocked. Therefore, [Printable after unlocked] is displayed (S908), and the printable information 23*b* corresponding to the selected file is set to [Printable after, unlocked] (S909). Then, it is determined whether file information is readable without unlocking the security (S910).

In the process of S910, if it is determined that files are readable without unlocking the security (S910: YES), the process goes to the process of S906. If not readable (S910: NO), a substitute image is displayed (S911), and the process is terminated. In the process of S910, as understood in FIG. 9, it is determined that file 8 among the files 8 and 9 is readable without unlocking the security (S910: YES), and it is determined that file 9 is not readable (S910: NO).

Display of [Printable after unlocked] in the process of S908 and depiction of reduced image in the process of S906 are executed in file 8 as described above. [Printable after unlocked] is depicted underneath the file 8, and the reduced image of the file 8 is displayed in the part enclosed by the square.

In contrast, display of [Printable after unlocked] in the process of S908 and display of reduced image in the process of S911 are executed in file 9 as described above. As shown in FIG. 16, [Printable after unlocked] is displayed underneath the file 9, and a substitute image (e.g. a plurality of dots) is depicted in the part enclosed by the square of the file 9.

In the process of S921, since the user information of the selected file is not matched and is unprintable, [Unprintable] is displayed (S921), and the printable information 23*b* corresponding to the selected file is set to [NO] (S922). Then, a substitute image is displayed (S923), and the process is terminated. As described above, files for which the user information is not matched although the user information can be acquired are files 3 and 10 through 12. As shown in FIG. 16, [Unprintable] is displayed underneath the files 3 and 10 through 12, and respective substitute images (e.g. lattice-shaped image) are depicted.

In the process of S901, if the user information cannot be acquired from the designated file (S901: NO), it is determined whether the user information is encrypted (S931). Therefore, in the process of S931, as understood in FIG. 9, it is determined that the user information in files 1 and 4 through 6 among files 1, 4 through 6 and 13 through 21 is not encrypted (S931: NO), and it is determined that the user information in files 13 through 21 is encrypted (S931: YES).

In the process of S931, if it is determined that the user information is not encrypted (S931: NO), the user information could not be acquired although it is not encrypted. This means, no user information is set (NO), the process goes to the process of S921, and [Unprintable] is displayed (S921). Then, printable information 23*b* corresponding to the selected file is set to [NO] (S922), a substitute image is displayed (S923), and the process is terminated. As described above, files for which the user information is not encrypted are files 1, and 4 through 6. As shown in FIG. 16, [Unprintable] is displayed underneath the files 1, and 4 through 6, and respective substitute images (e.g. lattice-shaped image) are depicted.

In contrast, in the process of S931, if it is determined that the user information is encrypted (S931: YES), no user information can be acquired because the user information is encrypted. Thus, since it becomes unclear whether printable until the encryption is unlocked, [Unclear until unlocked] is displayed (S932), and the printable information 23b of the designated file is set to [Unclear] (S933). Then, the process goes to S934.

In the process of S934, it is determined whether a file for which the user information is encrypted is readable without unlocking the security (S934). Therefore, in S934, as understood in FIG. 9, it is determined that files 13, 14, 16, 17, 19 and 20 among files 13 through 21 are readable (S934: YES), and it is determined that files 15, 18 and 21 are not readable (S934: NO).

In the process of S934, it is determined that a file is readable without unlocking the security (S934: YES), the reduced image of the selected file is displayed (S935), and the process is terminated.

Display of [Unclear until unlocked] in the process of S932 and display of a reduced image in the process of S935 are executed in files 13, 14, 16, 17, 19 and 20 as described above. As shown in FIG. 16, [Unclear until unlocked] is depicted underneath the files 13, 14, 16, 17, 19 and 20, and the reduced images of the respective files are displayed in the parts enclosed by the square of the respective files.

In contrast, in the process of S934, it is determined that a file for which the user information is encrypted is not readable without unlocking the security (S934: NO), a substitute image is displayed (S936), and the process is terminated.

Display of [Unclear until unlocked] in the process of S932 and display of a substitute image in the process of S936 are executed in files 15, 18 and 21 as described above. As shown in FIG. 16, [Unclear until unlocked] is displayed underneath the files 15, 18 and 21, and substitute images (e.g. a plurality of lines) are displayed in the parts enclosed by the square of the files 15, 18 and 21.

As described in the panel display process above, where users permitted to print are not restricted, [Printable] is displayed together with display of reduced images of the respective files. If a file is set to security YES, and is not readable and printable until the security is unlocked, it is configured that [Printable after unlocked] is displayed together with a substitute image, and the user is not permitted to recognize the file information. Therefore, the user can recognize printable files by checking the panel display. In addition, a substitute image is displayed if a file is set to Security YES and is not readable. Accordingly, it is possible to prevent the file information from being known to an outsider.

Herein, [Unprintable], [Printable], [Printable after unlocked] and [Unclear until unlocked] are displayed where the user permitted to use is restricted. Accordingly, it is possible for a user to recognize a file that becomes printable, a file that becomes unprintable, a file that becomes printable if the security is unlocked, and a file for which it is unclear whether the file becomes printable until the security is unlocked since the user information is encrypted. A substitute image is displayed if a file is unprintable or is not readable with the security set to YES, wherein it is possible to prevent the file information from being known to an outsider.

Figure 17:
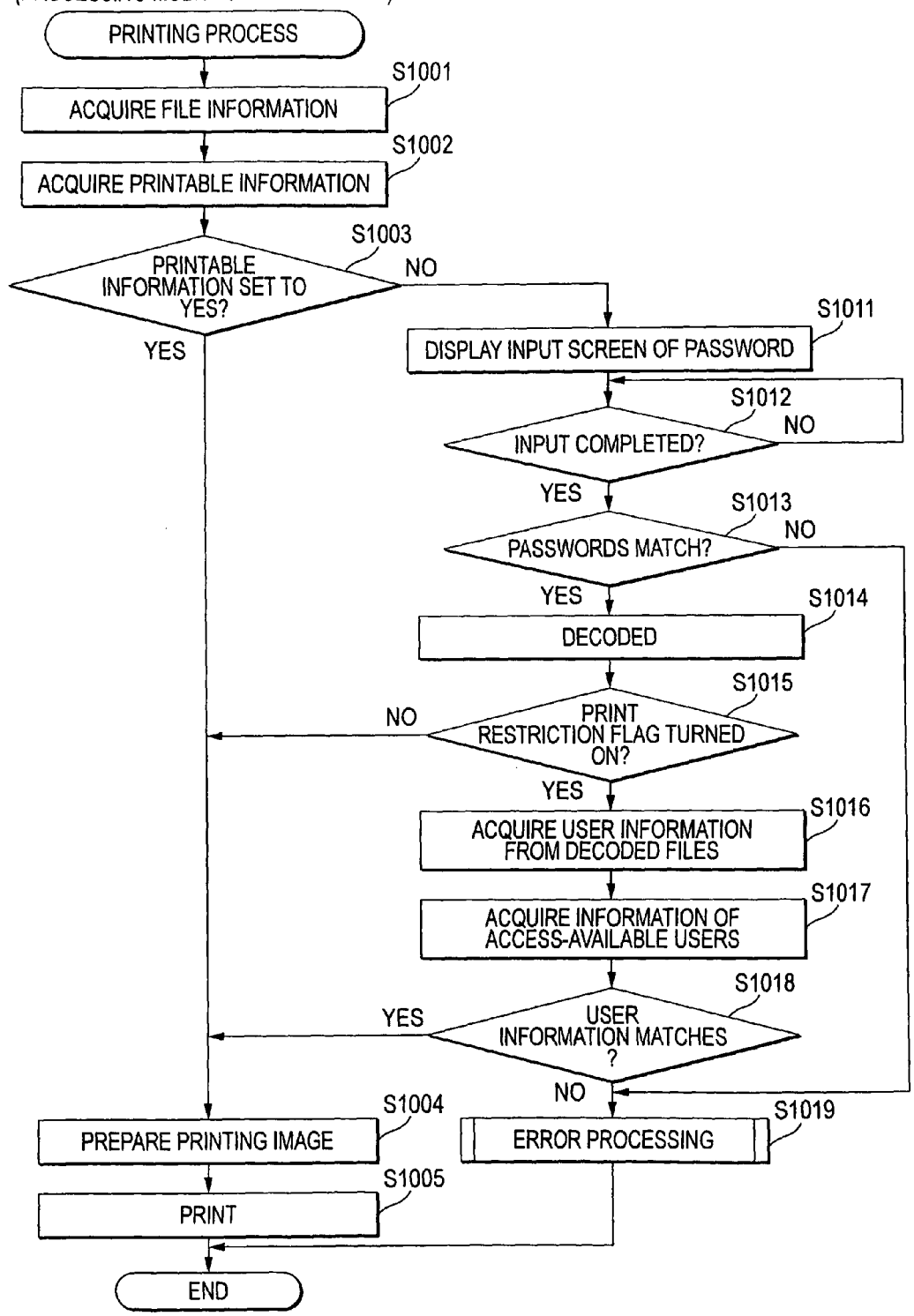
FIG. 17 is an exemplary flowchart showing a printing process.

With reference to FIG. 17, a description is given of a printing process to print file information stored in a memory card. FIG. 17 is an exemplary flowchart showing a printing process that is executed by the CPU 21 of a multi-function device 1. The printing process is executed when a user (operator) operates the operation key 40, selects [Print] among a plurality of functions, and selects a file that becomes [Printable], [Printable after unlocked] or [Unclear until unlocked] with the [Print] function selected. It is configured that a file which becomes [Unprintable] cannot be selected. That is, it is configured that the printing process is executed where a file for which the printable information 23b becomes [Printable], [Printable after unlocked] and [Unclear], and a file which becomes [Unprintable] cannot be selected.

If the printing process is executed, it is determined whether the information of a file selected by a user is acquired from the file information storing area 23a (S1001), the printable information 23b is acquired (S1002), and the acquired printable information 23b is set to [YES] (S1003).

In the process of S1003, if the acquired printable information 23b is set to [YES] (S1003: YES), the print becomes possible as it is, a print image is prepared from the acquired file information (S1004), the print is executed (S1005), and the process is terminated.

In contrast, since it is necessary to unlock the security if the acquired printable information 23b is set to [YES after unlocked] or [Unclear] (S1003: NO), an input screen of the password is displayed on the liquid crystal display 41 in order to unlock the security (S1011).

If the input screen of password is displayed, it is determined whether input of the password is completed by a user (S1012), the process stands by until the user inputs the password (SS1012: NO), the process goes to S1013 after the password is input by a user.

In the process of S1013, it is determined whether the password input by the user matches with (or corresponds to) the password stored in the password storing area 24b (S1013). If the passwords are not matched (S1013: NO), it means that a user who does not know the password operates. Thus, an error process is executed (S1019), and the process is terminated. The error process is executed by displaying [Unprintable] on the liquid crystal display 41, notifying [Unprintable] by means of a speaker 72, or notifying the same by concurrently using both the liquid crystal display 41 and the speaker 72.

In the process of S1013, if the input password matches with the password stored in the password storing area 24b (S1013: YES), it is determined that the operation is executed by an operator who knows the password. Thus, the selected file is decoded (S1014), and it is determined whether the print restriction flag 24d is set to ON, in order to determine whether a user is restricted (S1015).

In the process of S1015, if the print restriction flag 24d is set to OFF (S1015: NO), the user is not restricted. Thus, the process goes to the process of S1004 to execute printing. In S1004, a print image is prepared, and the printing is executed. Then, the process is terminated.

In contrast, in the process of S1015, if the print restriction flag 24d is set to ON (S1015: YES), the user permitted to print is restricted. Thus, the user information is acquired from the decoded file (S1016), and user information stored in the user storage area 24c is acquired (S1017). It is determined whether the user information acquired in the process of S1016 matches with the user information acquired in the process of S1017 and stored in the user storage area 24c (that is, whether an access-available user) (S1018).

In the process of S1018, if the user information is matched (S1018: YES), the file becomes printable. Therefore, the process goes to the process of S1004, a printing image is prepared, and the printing is executed. The process is terminated.

In contrast, in the process of S1018, if the user information is not matched (S1018: NO), the file becomes unprintable. Therefore, the process goes to the process of S1019, and, after the error process is executed, the printing process is terminated.

As described above, the multi-function device 1 is able to execute direct printing, permits printing where the user information stored in the user storage area 24c matches with the user information of files 1 through 21, and prohibits printing where the user information is not matched. Therefore, since an outsider who does not know the user information is not able to print at his option, it is possible to prevent important information from leaking or to prevent consumables such as ink, sheets and toner from being consumed more than necessary.

In addition, if the security is not set to YES, permission or prohibition of printing is set based on the user information, and there is no need to input the password. Therefore, it becomes possible to print file information in a memory card without doing any cumbersome work.

Further, where the security is set to YES, permission and prohibition of printing are set based on the user information included in files although input of the password is required. Therefore, even if the password should leak, it is possible to prohibit printing by the user information.

As described above, the present invention was described on the basis of the respective aspects. However, aspects of the present invention are not limited thereto. Various modifications and variations can be made.

For example, although the user storage area 24c is provided in the multi-function device 1, it may be provided in a computer connected to or communicating with the multi-function device 1 via a parallel I/F or a network I/F. In this aspect, if it is determined whether the user matches with the user information stored in a memory card, an inquiry may be given to a peripheral computer or the user information may be given from a peripheral computer.

In the present aspect, all the files stored in a memory card are acquired, it is determined whether respective user information match with each other. However, specified files, for example, only files in which documents are stored, only files in which images are stored, or based on application software or an operating system may be selected. Further, by acquiring files stored in a memory held by a computer connected to (communicating with) the multi-function device 1 via a parallel I/F or a network I/F, it may be determined whether respective user information is matched.

Further, in the above-described aspect, a reduced image of a file is depicted in the part enclosed by the square of the respective files in the index printing and panel display. However, the information shown in the square may be any type if it can refer to the file name or the description stored therein.

Still further, in the above-described aspect, any one of [Printable], [Unprintable], [Unclear until unlocked] and [Printable after unlocked] is depicted underneath files 1 through 21. However, only the files which become printable may be printed for index or displayed for panel. Further, only the files which become unprintable may be printed for index or displayed for panel. Still further, files in which some of [Printable], [Unprintable], [Unclear until unlocked] and [Printable after unlocked] may be combined and printed for index or displayed for panel.

In the above-described aspect, input of the administrator information and password is executed directly by using the operation key 40. However, the multi-function device may include a card reader, and the administrator information and password may be input from an IC card in which the administrator information and password are stored.

In the above-described aspect, the multi-function device 1 includes both a function of index printing and a function of panel display. However, the multi-function device 1 may include either one of them.

Further, in the above-described aspect, the multi-function device 1 includes both a function of index printing and a function of panel display. However, a printer having a printing function and a display function may include the function of index printing and the function of panel display.

Here, the process of S601 in FIG. 8 and the process of S706 in FIG. 12 function as the reading unit. The process of S603 in FIG. 8 and the process of S902 in FIG. 14 function as the determining unit. The processes of S607 and S613 in FIG. 8 and the processes of S905 and S922 in FIG. 14 function as the direct-printing controlling unit. The process of S1005 in FIG. 17 when depiction of [Printable] is set functions as the print-executing unit. The process of S411 in FIG. 6 (S506 in FIG. 7, and S608 in FIG. 8), and the processes of S804 in FIG. 13 and S906 in FIG. 14 function as the permission information outputting unit. The process of S411 of FIG. 6 (S614 in FIG. 8) when depiction of [Unprintable] is set and the process of S923 in FIG. 14 function as the prohibition information outputting unit. The process for determining whether the administrators match with each other in the process of S204 in FIG. 4 functions as the operator determining unit. The process of YES in S204 in FIG. 4 functions as the modification permitting unit. The process for shifting to successive processes, in which S204 becomes YES and S204 becomes NO, of FIG. 4 functions as the user information outputting controlling unit. The process of S601 in FIG. 8 and the process of S706 in FIG. 12 function as the process of reading identification information. The process of S603 in FIG. 8 and the process of S902 in FIG. 14 function as the determining process. The processes of S607 and S613 in FIG. 8, and processes S905 and S922 in FIG. 14 function as the direct printing controlling process. The process of S1005 in FIG. 17 functions as the print-executing process.

In addition to the above-described aspect, cases where the identification information does not correspond to the user information may include a case where the user information stored in the user storage differs from the identification information (user information read by the reading unit), a case where any user information is not included in the data (predetermined information) and no identification information or user information is read, and a case where a condition (e.g. security) is given to read the data (predetermined information) and no identification information or user information is read.

Further, cases where the inquiring unit responds that the identification information does not correspond to the user information may include a case where the user information stored in the user storage differs from the identification information (user information read by the reading unit), a case where no identification information (user information) is included in the data (predetermined information) and no identification information or user information is read, and a case where a condition (e.g. security) is given to read the data (predetermined information) and any identification or user information is not read.

Still further, cases where the identification information does not correspond to the user information may include a case where the user information read from the user storage by the reading user information step differs from the identification information (user information) read from the data (predetermined information) by the identification information reading step, a case where no identification information (user information) is included in the data (predetermined information) and no identification information or user information is read in the identification information reading step, and a case where a condition (e.g. security) is given to read the data (predetermined information), and no identification information or user information is read in the identification information reading step.

Still further, the user storage in which user information read by the process of reading user information is stored may be equipped in a printer that executes printing, or may be equipped in a peripheral unit capable of communicating with the printer.

According to another aspect of the present invention, in the printer, wherein: if a plurality of data are stored in the storing unit, the reading unit reads a plurality of identification information from the plurality of data; the determining unit determines whether each of the plurality of identification information corresponds to the user information; and the printer further comprises a permit information outputting unit that outputs print-permitting information indicating a reading source of the identification information that is determined to correspond to the user information.

The permit information outputting unit may be such that print-permitting information is displayed on the screen of a liquid crystal display unit, etc., or that print-permitting information is printed out on a recording medium (e.g. sheet), or that print-permitting information is notified by a sound unit which outputs voices.

According thereto, the print-permitting information indicating the predetermined information that is the reading source of the user information determined to correspond to the user information stored in the user storage by the determining unit is outputted. Accordingly, an operator can recognize the predetermined information permitted to be printed by the print-executing unit.

According to still another aspect of the present invention, the print-executing unit executes printing based on print-permitting information selected by an operator from the outputted print-permitting information.

According thereto, the operator is able to select printable predetermined information based on the output of the print-permitting information. Accordingly, since the predetermined information prohibited to be printed is selected, it is possible to prevent occurrence of trouble by which printing is not executed although predetermined information is selected.

In addition, since only the predetermined information recognized as printable information is brought into the objects to be selected, an operator is able to easily select the predetermined information.

According to still another aspect of the present invention, in the printer, wherein: if a plurality of data is stored in the storing unit, the reading unit reads a plurality of identification information from the plurality of data; the determining unit determines whether each of the plurality of identification information corresponds to the user information; and the printer further comprises a prohibition information outputting unit that outputs printing prohibition information indicating a reading source of the user information that is determined not to correspond to the user information.

The prohibition information outputting unit may be such that print-prohibiting information is displayed on the screen of a liquid crystal display unit, etc., or that print-prohibiting information is printed out on a recording medium (e.g. sheet), or that print-prohibiting information is notified by a sound unit which outputs voices.

According thereto, the print-prohibiting information indicating predetermined information that is the reading source of the user information determined not to correspond to the user information stored in the user storage by the determining mean is outputted by the prohibition information outputting unit. Accordingly, the operator can recognize that predetermined information which cannot be printed by the print-executing unit is stored in the storing unit.

Since the operator can recognize that the storing unit is not empty, there is no case where with important information remaining in the storing unit, the storing unit is discarded or formatted or transferred even if the information cannot be printed out.

Herein, for example, if the user information stored in the user storage cannot be changed, only a specified operator can print at all times, wherein the convenience of use thereof is worsened. In contrast, if the user information is simply changed, finally, any person becomes able to print.

According to still another aspect of the present invention, the printer further includes: an operator storage that stores operator information about an operator who is permitted to execute a modification function to modify the user information; an operator determining unit that determines whether the operator information corresponds to the information input by an operator; and a modification-permitting unit that permits execution of the modification function if the operator determining unit determines that the operator information corresponds to the information input by the operator.

According thereto, execution of the modification function is permitted by the modification-permitting unit if the operator determining unit judges that the operator information corresponds to the operator information. Therefore, the operator who knows the operator information can modify the user information stored in the user storage. Accordingly, it is possible to prevent occurrence of adverse effects such as worsening in the convenience of use or elimination of restriction of users capable of printing.

Herein, for example, if the current user information stored in the user storage cannot be recognized, there are cases where the already stored user information is doubly registered or, to the contrary, the user information is not stored where the user information is intended to be stored.

According to still another aspect of the present invention, the printer further includes: a user information output controlling unit that is operable to: permit output of the user information stored in the user storage if the operator determining unit determines that the operator information corresponds to the information input by the operator; and prohibit output of the user information if the operator determining unit determines that the operator information does not correspond to the information input by the operator, or if no information is input.

According thereto, an operator who knows the operator information can confirm the outputted user information. Accordingly, it is possible to prevent occurrence of adverse effects such as overlapping registration of the user information or the user information not being stored.

Further, since a majority of operators who do not know the operator information cannot know the user information stored in the printer (although it is a matter of course that they know the user information of the operators themselves for which direct printing is permitted), it becomes possible to prevent direct printing by unspecified operators using the others' user information.

According to still another aspect of the present invention, the identification information, which is read by the reading unit, is set by a user information setting function included in an operating system executed by a computer.

According thereto, it is possible to set prohibition or permission of printing in the printer having a direct-printing function by using the existing operating system without any addition of a new feature to the computer.

According to still another aspect of the present invention, the identification information, which is read by the reading unit, is set by a user information setting function included in application software for executing specified tasks in a computer.

According thereto, it is possible to set prohibition or permission of printing in the printer having a direct-printing function by using the existing application software without any addition of a new feature to the computer.

According to still another aspect of the present invention, in the communication system, wherein: if a plurality of data are stored in the storing unit, the reading unit reads a plurality of identification information from the plurality of data; the inquiring unit inquiries from the peripheral unit whether each of the plurality of identification information corresponds to the user information; and the printer further comprises a permit information outputting unit that outputs print-permitting information if the inquiring unit responds that the read identification information corresponds to the user information, the print-permitting information indicating data that is a reading source of the identification information corresponding thereto.

The permit information outputting unit may be such that print-permitting information is displayed on the screen of a liquid crystal display unit, etc., or that print-permitting information is printed out on a recording medium (e.g. sheet), or that print-permitting information is notified by a sound unit which outputs voices.

According thereto, the permit information outputting unit outputs the print-permitting information indicating the predetermined information that is the reading source of the user information to which the result of inquiry made by the inquiring unit corresponds. Accordingly, the operator can recognize the predetermined information printable by the print-executing unit.

According to still another aspect of the present invention, the print-executing unit executes printing based on print-permitting information selected by an operator from the outputted print-permitting information.

According thereto, the operator is able to select printable predetermined information based on the output of the print-permitting information. Thus, it is possible to prevent the occurrence of trouble such as printing being not executed, etc., since predetermined information whose printing is prohibited is selected although the predetermined information is selected.

Further, since only the predetermined information recognized as printable information is brought into the object to be selected, an operator can easily select the predetermined information.

According to still another aspect of the present invention, in the communication system, wherein: if a plurality of data are stored in the storing unit, the reading unit reads a plurality of identification information from the plurality of data; the inquiring unit inquiries from the peripheral unit whether each of the plurality of identification information corresponds to the user information; and the printer further comprises a prohibition information outputting unit that outputs print-prohibiting information if the inquiring unit responds that the read identification information does not correspond to the user information, the print-prohibiting information indicating data that is a reading source of the user information corresponding thereto.

The prohibition information outputting unit may be such that print-prohibiting information is displayed on the screen of a liquid crystal display unit, etc., or that print-prohibiting information is printed out on a recording medium (e.g. sheet), or that print-prohibiting information is notified by a sound unit which outputs voices.

According thereto, the print-prohibiting information indicating predetermined information that is the reading source of user information to which the result of inquiry made by the inquiring unit does not correspond is outputted by the prohibition information outputting unit. Accordingly, the operator can recognize the predetermined information that cannot be printed by the print-executing unit.

Since the operator can recognize that the storing unit is not empty, there is no case where with important information remaining in the storing unit, the storing unit is discarded or formatted or transferred even if the information cannot be printed out.

According to still another aspect of the present invention, the communication system further includes: an operator storage that stores operator information about an operator who is permitted to execute a modification function to modify the user information; an operator determining unit that determines whether the operator information corresponds to information input by an operator; a modification-permitting unit that permits execution of the modification function if the operator determining unit determines that the operator information corresponds to the information input by the operator; and a transmission unit that transmits the modified user information if execution of the modification function is permitted by the modification-permitting unit and the user information is modified.

Further, the peripheral unit may include the operator storage, the operator determining unit and the modification-permitting unit. Accordingly, operator information input by an operator is transmitted to the peripheral unit, and the result of determination by the operator determining unit is received. The transmitting unit transmits the user information when the received determination result permits to execution of the modification function and the user information is changed.

According thereto, execution of the modification function is permitted by the modification-permitting unit if the operator information is determined to correspond to the stored operator information by the operator determining unit. Therefore, the operator who knows the operator information can modify the user information stored in the user storage. Accordingly, it is possible to prevent occurrence of adverse effects such as worsening in the convenience of use or elimination of restriction of users capable of printing.

According to still another aspect of the present invention, the communication system further includes: a user information acquisition controlling unit that is operable to: permit acquisition of the user information stored in the user storage of the peripheral unit if the operator determining unit determines that the operator information corresponds to the information input by the operator; and prohibit acquisition of the user information stored in the user storage of the peripheral unit if the operator determining unit determines that the operator information does not correspond to the information input by the operator or if no operator information is input.

According thereto, the operator who knows the operator information acquires the user information and can confirm the user information, and the operator who does not know the operator information cannot acquire the user information.

Accordingly, the operator who knows the operator information can confirm the acquired user information, and prevents occurrence of any adverse effects such as the user information not being doubly registered or the user information not being stored.

Since permission and prohibition of printing are set by the direct-printing controlling unit based on the user information stored in the user storage, an operator (user) is able to execute printing without any input of a password, etc., when printing the predetermined information. Since the direct-printing function can execute printing by connecting the storing unit to the printer, it is preferable that printing is executed by a simple operation. Therefore, since cumbersome work such as input of a password can be reduced when printing the predetermined information, particularly, the communication system is suitable for a case where printing is executed by the direct-printing function.

According to still another aspect of the present invention, in the communication system, wherein: the identification information is set by a user information setting function included in an operating system executed by a computer; and the reading unit reads the identification information from the data.

According thereto, it is possible to set permission and prohibition of printing in the printer having a direct-printing function by using the current operating system without any addition of a new feature to the computer.

According to still another aspect of the present invention, in the communication system, wherein: the identification information is set by a user information setting function included in application software for executing specified tasks in a computer; and the reading unit reads the identification information from the data.

According thereto, it is possible to set permission and prohibition of printing in the printer having a direct-printing function by using the current application software without any addition of a new feature to the computer.

What is claimed is:

1. A printer having a direct-printing function for reading and printing data stored in a storing unit, the printer comprising:
    a connecting device that connects to the storing unit;
    a user storage that stores user information including information of users permitted to print using the direct-printing function;
    a reading unit that reads identification information from data stored in the storing unit;
    a determining unit that determines whether the identification information corresponds to the user information;
    a direct-printing controlling unit that is operable to:
        permit printing of the data using the direct-printing function if the determining unit determines that the identification information corresponds to the user information; and
        prohibit printing of the data using the direct-printing function if the determining unit determines that the identification information does not correspond to the user information; and
    a print-executing unit that executes printing if the direct-printing controlling unit permits printing of the data using the direct-printing function.

2. The printer according to claim 1, wherein:
    if a plurality of data are stored in the storing unit, the reading unit reads a plurality of identification information from the plurality of data;
    the determining unit determines whether each of the plurality of identification information corresponds to the user information; and
    the printer further comprises a permit information outputting unit that outputs print-permitting information indicating a reading source of the identification information that is determined to correspond to the user information.

3. The printer according to claim 2, wherein the print-executing unit executes printing based on print-permitting information selected by an operator from the outputted print-permitting information.

4. The printer according to claim 1, wherein:
    if a plurality of data is stored in the storing unit, the reading unit reads a plurality of identification information from the plurality of data;
    the determining unit determines whether each of the plurality of identification information corresponds to the user information; and
    the printer further comprises a prohibition information outputting unit that outputs printing prohibition information indicating a reading source of the user information that is determined not to correspond to the user information.

5. The printer according to claim 1, further comprising:
    an operator storage that stores operator information about an operator who is permitted to execute a modification function to modify the user information;
    an operator determining unit that determines whether the operator information corresponds to the information input by an operator; and
    a modification-permitting unit that permits execution of the modification function if the operator determining unit determines that the operator information corresponds to the information input by the operator.

6. The printer according to claim 5, further comprising:
    a user information output controlling unit that is operable to:
        permit output of the user information stored in the user storage if the operator determining unit determines that the operator information corresponds to the information input by the operator; and
        prohibit output of the user information if the operator determining unit determines that the operator information does not correspond to the information input by the operator, or if no information is input.

7. The printer according to claim 1, wherein the identification information, which is read by the reading unit, is set by a user information setting function included in an operating system executed by a computer.

8. The printer according to claim 1, wherein the identification information, which is read by the reading unit, is set by a user information setting function included in application software for executing specified tasks in a computer.

9. A communication system comprising:
    a printer having a direct-printing function for reading and printing data stored in a storing unit; and
    a peripheral unit that is capable of communicating with the printer, wherein:
    the peripheral unit comprises:
    a user storage that stores user information of users permitted to print using the direct-printing function; and
    the printer includes:
    a connecting device that connects to the storing unit;
    a reading unit that reads identification information from the data stored in the storing unit;

an inquiring unit that inquires from the peripheral unit whether the identification information corresponds to the user information;

a direct-printing controlling unit that is operable to:
  permit printing of the data using the direct-printing function if the inquiring unit responds that the identification information corresponds to the user information; and
  prohibit printing of the data using the direct-printing function if the inquiring unit responds that the identification information does not correspond to the user information; and a print-executing unit that executes printing if the direct-printing controlling unit permits printing of the data using the direct-printing function.

10. The communication system according to claim 9, wherein:
  if a plurality of data are stored in the storing unit, the reading unit reads a plurality of identification information from the plurality of data;
  the inquiring unit inquiries from the peripheral unit whether each of the plurality of identification information corresponds to the user information; and
  the printer further comprises a permit information outputting unit that outputs print-permitting information if the inquiring unit responds that the read identification information corresponds to the user information, the print-permitting information indicating data that is a reading source of the identification information corresponding thereto.

11. The communication system according to claim 10, wherein the print-executing unit executes printing based on print-permitting information selected by an operator from the outputted print-permitting information.

12. The communication system according to claim 9, wherein:
  if a plurality of data are stored in the storing unit, the reading unit reads a plurality of identification information from the plurality of data;
  the inquiring unit inquiries from the peripheral unit whether each of the plurality of identification information corresponds to the user information; and
  the printer further comprises a prohibition information outputting unit that outputs print-prohibiting information if the inquiring unit responds that the read identification information does not correspond to the user information, the print-prohibiting information indicating data that is a reading source of the user information corresponding thereto.

13. The communication system according to claim 9, further comprising:
  an operator storage that stores operator information about an operator who is permitted to execute a modification function to modify the user information;
  an operator determining unit that determines whether the operator information corresponds to information input by an operator;
  a modification-permitting unit that permits execution of the modification function if the operator determining unit determines that the operator information corresponds to the information input by the operator; and
  a transmission unit that transmits the modified user information if execution of the modification function is permitted by the modification-permitting unit and the user information is modified.

14. The communication system according to claim 13, further comprising:
  a user information acquisition controlling unit that is operable to:
    permit acquisition of the user information stored in the user storage of the peripheral unit if the operator determining unit determines that the operator information corresponds to the information input by the operator; and
    prohibit acquisition of the user information stored in the user storage of the peripheral unit if the operator determining unit determines that the operator information does not correspond to the information input by the operator or if no operator information is input.

15. The communication system according to claim 9, wherein:
  the identification information is set by a user information setting function included in an operating system executed by a computer; and
  the reading unit reads the identification information from the data.

16. The communication system according to claim 9, wherein:
  the identification information is set by a user information setting function included in application software for executing specified tasks in a computer; and
  the reading unit reads the identification information from the data.

17. A printing method for executing direct printing in a printer by reading data stored in a storing unit, the printing method comprising:
  reading user information from a user storage, the user storage storing the user information for which direct printing is permitted;
  reading identification information from the data stored in the storing unit connected to the printer;
  determining whether the identification information corresponds to the user information;
  direct printing the data if it is determined that the identification information corresponds to the user information; and
  prohibiting direct printing of the data if it is determined that the identification information does not correspond to the user information.

* * * * *